US012633072B2

(12) United States Patent
Ikeda et al.

(10) Patent No.: US 12,633,072 B2
(45) Date of Patent: May 19, 2026

(54) INFORMATION PROCESSING APPARATUS, INFORMATION PROCESSING METHOD, AND PROGRAM

(71) Applicant: Sony Group Corporation, Tokyo (JP)

(72) Inventors: Yasunari Ikeda, Tokyo (JP); Naomasa Takahashi, Chiba (JP); Yoichi Hirota, Kanagawa (JP); Masamoto Horikawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 175 days.

(21) Appl. No.: 18/292,156

(22) PCT Filed: Feb. 17, 2022

(86) PCT No.: PCT/JP2022/006405
§ 371 (c)(1),
(2) Date: Jan. 25, 2024

(87) PCT Pub. No.: WO2023/013114
PCT Pub. Date: Feb. 9, 2023

(65) Prior Publication Data
US 2024/0371120 A1     Nov. 7, 2024

(30) Foreign Application Priority Data
Aug. 2, 2021     (JP) ................................. 2021-126424

(51) Int. Cl.
| | |
|---|---|
| *G06T 19/20* | (2011.01) |
| *G06T 7/20* | (2017.01) |
| *G06V 10/44* | (2022.01) |

(52) U.S. Cl.
CPC ................ *G06T 19/20* (2013.01); *G06T 7/20* (2013.01); *G06V 10/44* (2022.01); *G06T 2219/2004* (2013.01)

(58) Field of Classification Search
CPC ... G06T 19/20; G06T 2219/2004; G06T 7/20; G06T 19/00; G06V 10/44; H04N 21/65
See application file for complete search history.

(56) References Cited

U.S. PATENT DOCUMENTS

2021/0375052 A1* 12/2021 Abiko ..................... A63F 13/65

FOREIGN PATENT DOCUMENTS

| JP | 2019-175322 A | 10/2019 |
|---|---|---|
| JP | 2020-162084 A | 10/2020 |
| JP | 2021-047720 A | 3/2021 |

* cited by examiner

*Primary Examiner* — Sing-Wai Wu
(74) *Attorney, Agent, or Firm* — Paratus Law Group, PLLC

(57) ABSTRACT

There is provided an information processing apparatus and a technology capable of improving convenience of a user who is allowed to sequentially log in to a plurality of virtual spaces. The information processing apparatus includes a conversion unit that performs conversion of a value used for display of a target object arranged in a virtual space on the basis of the value used for display of the target object and a conversion value determined on the basis of at least scale information in a first virtual space to obtain a converted value.

19 Claims, 15 Drawing Sheets

*FIG. 5*

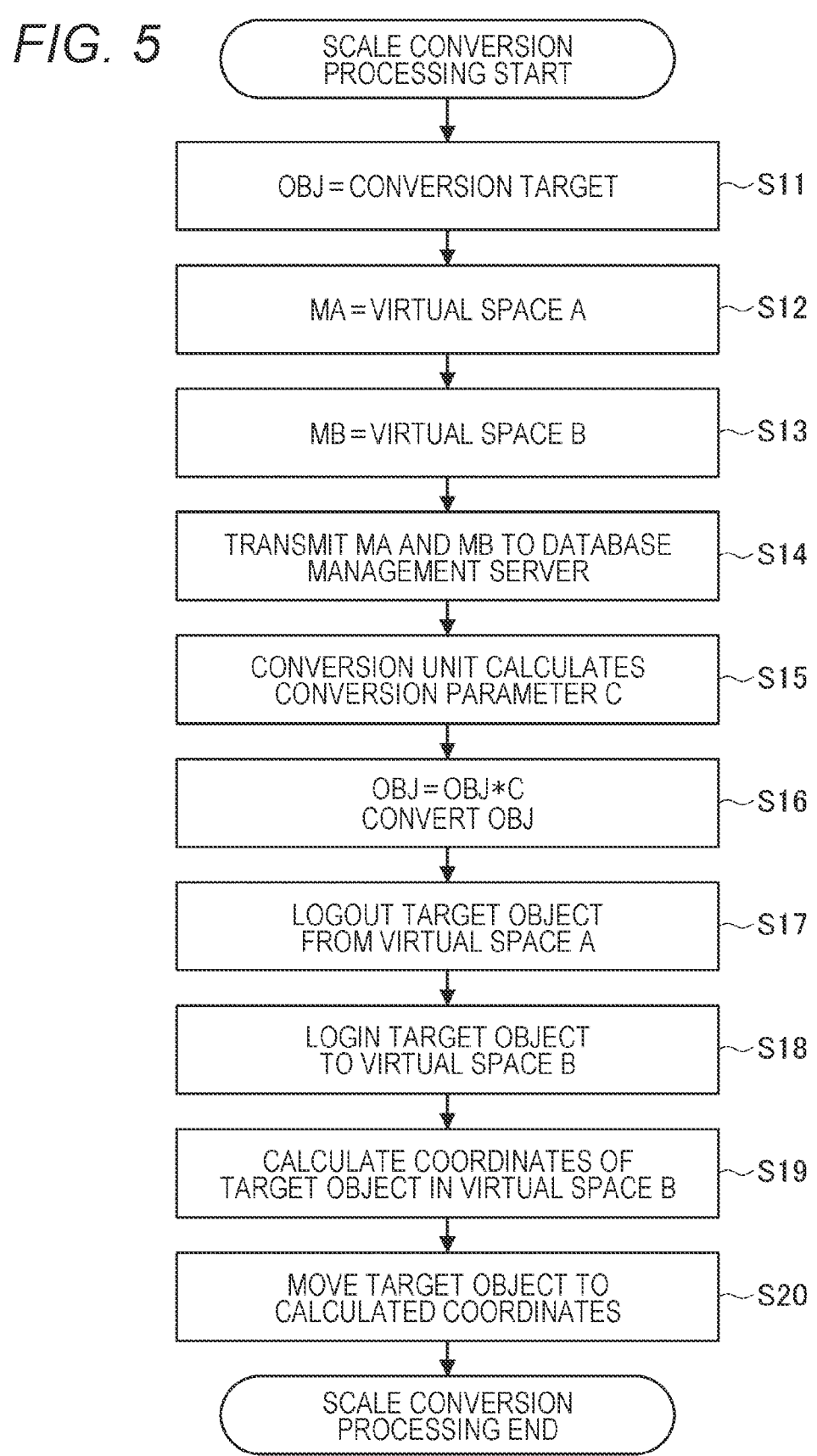

SCALE CONVERSION
PROCESSING START

OBJ = CONVERSION TARGET — S11

MA = VIRTUAL SPACE A — S12

MB = VIRTUAL SPACE B — S13

TRANSMIT MA AND MB TO DATABASE
MANAGEMENT SERVER — S14

CONVERSION UNIT CALCULATES
CONVERSION PARAMETER C — S15

OBJ = OBJ*C
CONVERT OBJ — S16

LOGOUT TARGET OBJECT
FROM VIRTUAL SPACE A — S17

LOGIN TARGET OBJECT
TO VIRTUAL SPACE B — S18

CALCULATE COORDINATES OF
TARGET OBJECT IN VIRTUAL SPACE B — S19

MOVE TARGET OBJECT TO
CALCULATED COORDINATES — S20

SCALE CONVERSION
PROCESSING END

*FIG. 10*

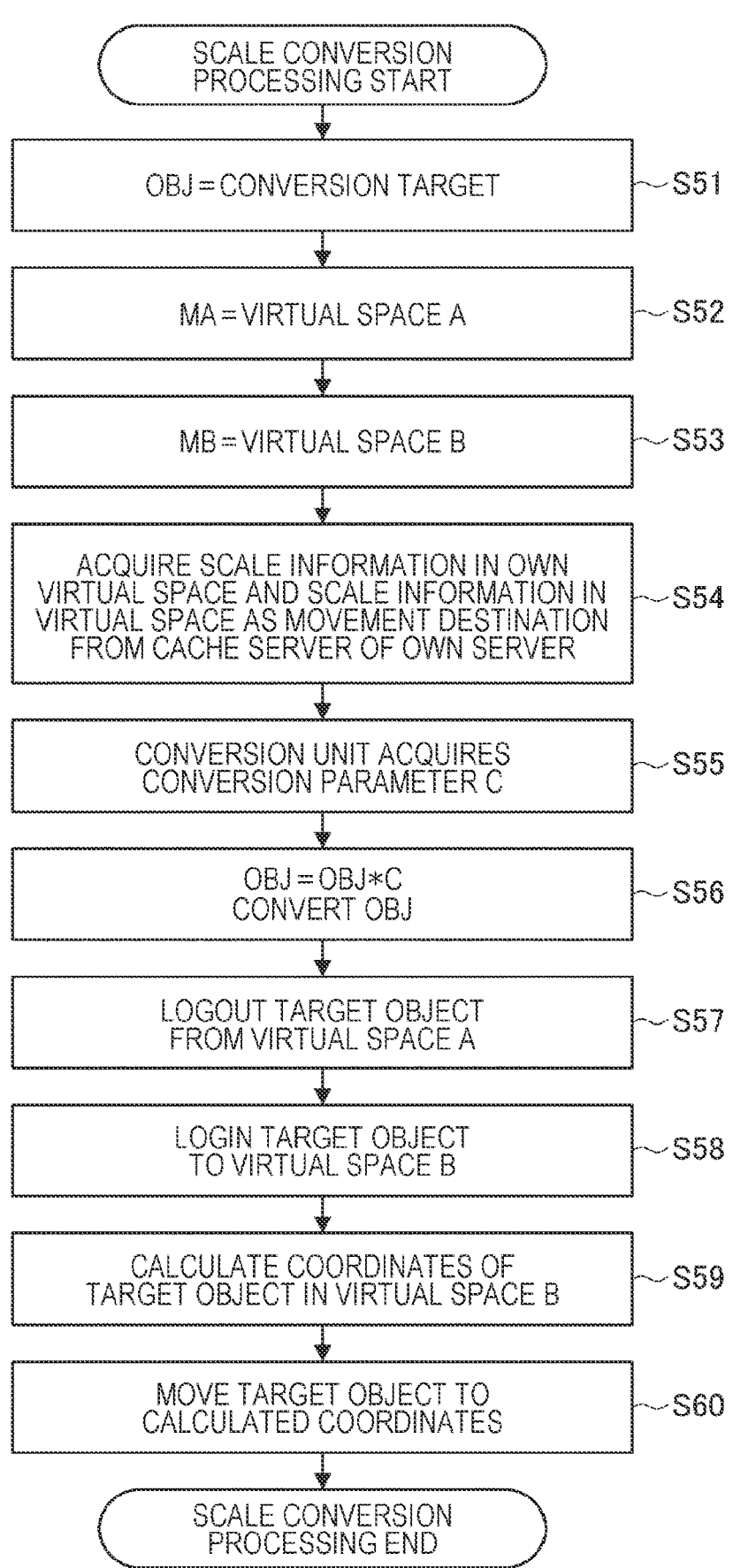

SCALE CONVERSION
PROCESSING START

OBJ = CONVERSION TARGET — S51

MA = VIRTUAL SPACE A — S52

MB = VIRTUAL SPACE B — S53

ACQUIRE SCALE INFORMATION IN OWN
VIRTUAL SPACE AND SCALE INFORMATION IN
VIRTUAL SPACE AS MOVEMENT DESTINATION
FROM CACHE SERVER OF OWN SERVER — S54

CONVERSION UNIT ACQUIRES
CONVERSION PARAMETER C — S55

OBJ = OBJ*C
CONVERT OBJ — S56

LOGOUT TARGET OBJECT
FROM VIRTUAL SPACE A — S57

LOGIN TARGET OBJECT
TO VIRTUAL SPACE B — S58

CALCULATE COORDINATES OF
TARGET OBJECT IN VIRTUAL SPACE B — S59

MOVE TARGET OBJECT TO
CALCULATED COORDINATES — S60

SCALE CONVERSION
PROCESSING END

*FIG. 11*

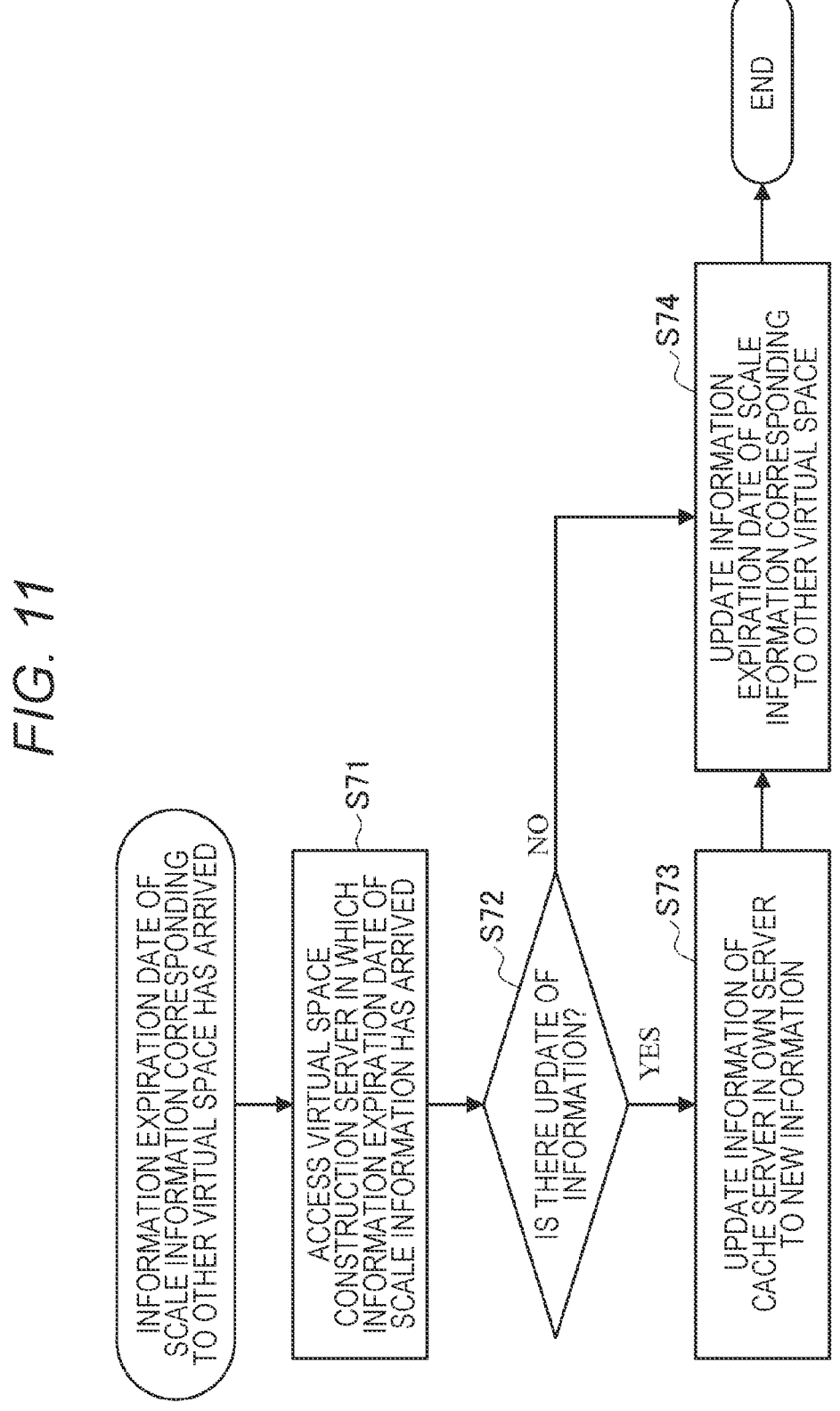

INFORMATION EXPIRATION DATE OF SCALE INFORMATION CORRESPONDING TO OTHER VIRTUAL SPACE HAS ARRIVED

ACCESS VIRTUAL SPACE CONSTRUCTION SERVER IN WHICH INFORMATION EXPIRATION DATE OF SCALE INFORMATION HAS ARRIVED — S71

IS THERE UPDATE OF INFORMATION? — S72

NO

YES

UPDATE INFORMATION OF CACHE SERVER IN OWN SERVER TO NEW INFORMATION — S73

UPDATE INFORMATION EXPIRATION DATE OF SCALE INFORMATION CORRESPONDING TO OTHER VIRTUAL SPACE — S74

END

FIG. 12

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2022/006405 (filed on Feb. 17, 2022) under 35 U.S.C. § 371, which claims priority to Japanese Patent Application No. 2021-126424 (filed on Aug. 2, 2021), which are all hereby incorporated by reference in their entirety.

TECHNICAL FIELD

The present disclosure relates to an information processing apparatus, an information processing method, and a program.

BACKGROUND ART

In recent years, services have attracted attention in which a large number of users log in to the same virtual space using their avatars. For example, a technology for constructing a virtual space to be logged in by a large number of users is known (see, for example, Patent Document 1).

CITATION LIST

Patent Document

Patent Document 1: Japanese Patent Application Laid-Open No. 2021-47720

SUMMARY OF THE INVENTION

Problems to be Solved by the Invention

At this time, it is desirable to provide a technology capable of reducing the sense of discomfort given to the user logging in to the virtual space.

Solutions to Problems

According to an aspect of the present disclosure, there is provided an information processing apparatus including a conversion unit that performs conversion of a value used for display of a target object arranged in a virtual space on the basis of the value used for display of the target object and a conversion value determined on the basis of at least scale information in a first virtual space to obtain a converted value.

Furthermore, according to another aspect of the present disclosure, there is provided an information processing method including performing conversion of a value used for display of a target object arranged in a virtual space on the basis of the value used for display of the target object and a conversion value determined on the basis of at least scale information in a first virtual space to obtain a converted value.

Furthermore, according to another aspect of the present disclosure, there is provided a program for causing a computer to function as an information processing apparatus including a conversion unit that performs conversion of a value used for display of a target object arranged in a virtual space on the basis of the value used for display of the target object and a conversion value determined on the basis of at least scale information in a first virtual space to obtain a converted value.

BRIEF DESCRIPTION OF DRAWINGS

FIG. 5 is a flowchart illustrating an operation example of scale conversion processing executed by an information processing system according to an embodiment of the present disclosure.

FIG. 10 is a flowchart illustrating an operation example of scale conversion processing executed by an information processing system using a distributed management method.

FIG. 11 is a flowchart illustrating an operation example of updating scale information executed by an information processing system using a distributed management method.

FIG. 12 is a diagram for explaining Modification 1 of the embodiment of the present disclosure.

MODE FOR CARRYING OUT THE INVENTION

Figure 1:
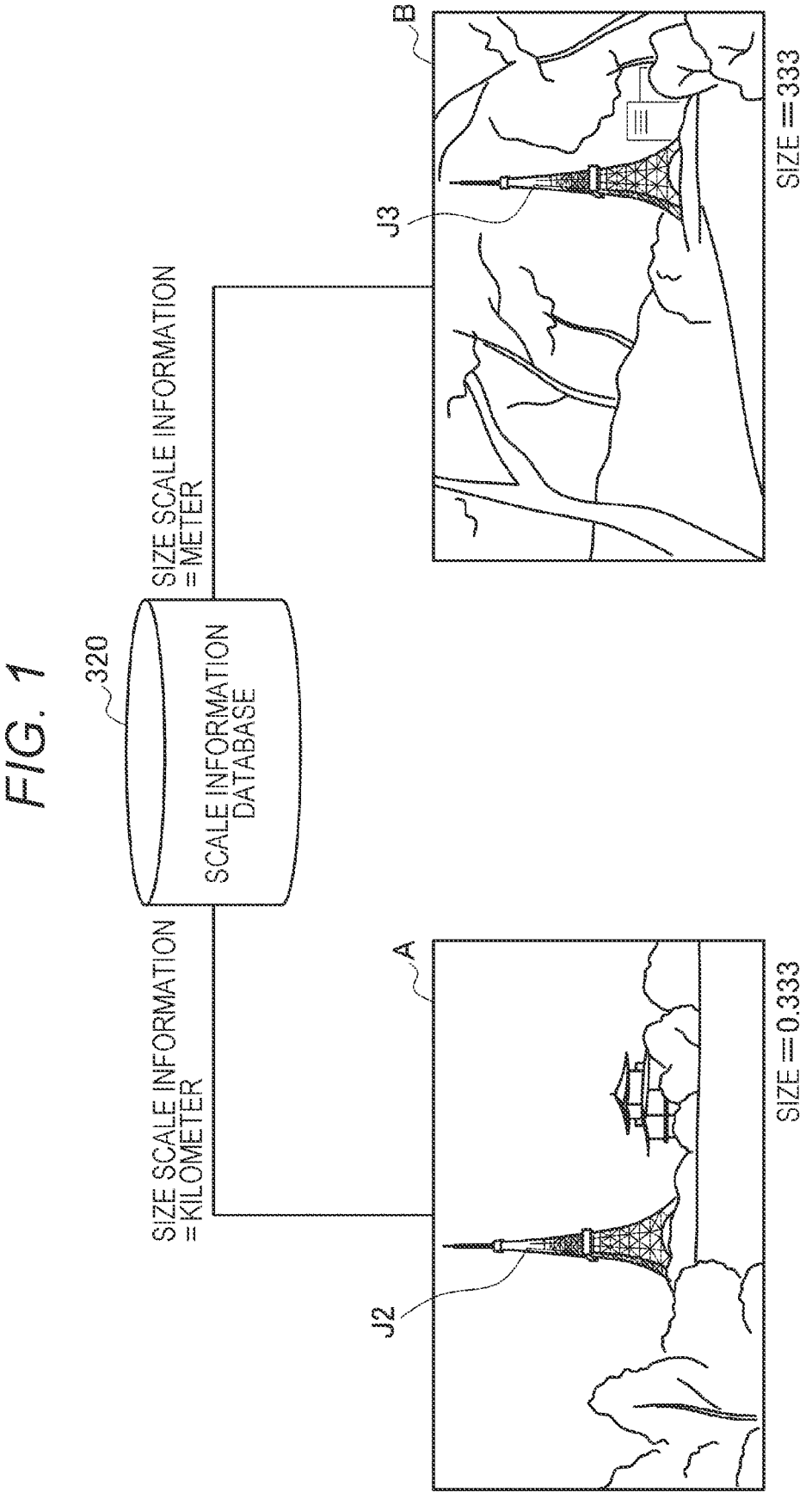
FIG. 1 is a diagram for explaining an outline of an embodiment of the present disclosure.

Hereinafter, preferred embodiments of the present disclosure will be described in detail with reference to the accompanying drawings. Note that, in the present specification and the drawings, components having substantially the same functional configurations are denoted by the same reference signs, and redundant descriptions are omitted.

In addition, in the present specification and the drawings, a plurality of components having substantially the same or similar functional configurations may be distinguished by attaching different numbers after the same reference signs. However, in a case where it is not particularly necessary to distinguish each of a plurality of components having substantially the same or similar functional configurations, only the same reference signs are attached. In addition, similar components of different embodiments may be distinguished by adding different alphabets after the same reference signs.

However, in a case where it is not necessary to particularly distinguish each of similar components, only the same reference signs are assigned.

Note that the description will be given in the following order.

0. Outline
1. Details of Embodiment
1.1. Contemplated Scenes
1.2. System Configuration Example
1.3. Centralized Management Method
1.4. Distributed Management Method
2. Various Modifications
2.1. Modification 1
2.2. Modification 2
2.3. Modification 3
2.4. Modification 4
2.5. Modification 5
3. Hardware Configuration Example
4. Conclusion

0. Outline

First, an outline of an embodiment of the present disclosure will be described. In recent years, services have attracted attention in which a large number of users log in to the same virtual space using their avatars. For example, a technique for constructing a virtual space logged in by a large number of users is known. The virtual space logged in by such a large number of users is also referred to as "metaverse".

In the virtual space, various target objects including an avatar corresponding to the user are arranged. For example, the target object may be represented by a set of a plurality of three-dimensional vertices and sides connecting these three-dimensional vertices. Such a target object not only stays in one virtual space but also can move between a plurality of virtual spaces. However, the scale information (that is, the standard for defining the environment) may be different depending on the virtual space. In such a case, the value used to display the target object varies depending on the virtual space.

It has been known that the problem that the value used to display the target object is changed due to such a difference in the scale information occurs in a case where general content (for example, a movie or the like) is displayed before the metaverse became popular.

For example, as an example of the scale information, a case is assumed where spatial scale information (hereinafter, also referred to as "size scale information") differs depending on content. For example, the size scale information may be a length of one scale in space.

For example, in a case of producing content using 3D computer graphics, a content creator determines scale information in advance, and proceeds with production of content according to the predetermined scale information. As an example, a case is assumed where one scale in space is defined as one meter in the software in the content A, and one scale in space is defined as one centimeter in the software in the content B. In such a case, production of the contents A and B proceeds according to the respective definitions.

As described above, in a case where the size scale information differs depending on the content, the spatial size of the target object as an example of the value used to display the target object differs depending on the content. Therefore, in general, the spatial size of the target object is corrected by a simple program, manual work, or the like so that there is no difference in the spatial size of the target object due to the content. As a result, the discomfort given to the user who views the content can be reduced.

Alternatively, as an example of the scale information, it is also assumed that temporal scale information (hereinafter, also referred to as "time scale information") differs depending on content. For example, the temporal scale information may be the number of images switched in one second (that is, the frame rate). The frame rate can be expressed by a frame per second (FPS) or the like. The smaller the FPS, the more jerky the motion is expressed, and the larger the FPS, the smoother the motion can be expressed.

In general, in Japanese animation works, a value of about 8 to 24 is set as the FPS, and in the latest home game machine, a value of about 30 to 60 is set as the FPS. In such a case, production of the work proceeds according to each setting.

As described above, in a case where the FPS differs depending on the content, the FPS as an example of the value used for displaying the target object differs depending on the content. Therefore, in general, the FPS is recorded in a file unit of the content, the recorded FPS is read at the time of reproducing the content, and the content is reproduced according to the read FPS so that there is no difference in the FPS depending on the content. As a result, the discomfort given to the user who views the content can be reduced.

Such a difference in the value used for displaying the target object depending on the content has been mainly known as a problem for a content creator (for example, a film producer or product developer, and the like). Meanwhile, in recent years when the metaverse is becoming more and more popular, it is very difficult for a general user who does not have specialized knowledge to understand a difference in a value used to display a target object in a virtual space and to correct the value used to display the target object.

Therefore, an embodiment of the present disclosure provides a technology of automatically reducing a difference in a value used for display of a target object by a virtual space. As a result, the discomfort given to the user who visually recognizes the target object can be reduced.

FIG. 1 is a diagram for explaining an outline of an embodiment of the present disclosure. Referring to FIG. 1, a virtual space A (second virtual space) exists. Furthermore, there is a virtual space B (first virtual space) different from the virtual space A.

In the virtual space A, the spatial size of the target object J2 (Tokyo tower) is "0.333". That is, in the virtual space A, one scale is set to 1 km=1000 m. Therefore, "one scale=1 km" is recorded in advance in a scale information database 320 as the size scale information corresponding to the virtual space A.

On the other hand, in the virtual space B, the spatial size of the target object J3 (Tokyo tower) which is the same target object as the target object J2 is "333". That is, one scale is set to 1 m in the virtual space B. Therefore, "one scale=1 m" is recorded in advance in the scale information database 320 as the size scale information corresponding to the virtual space B.

As an example, a case is assumed where the user moves the target object between the virtual space A and the virtual space B. At this time, in the embodiment of the present disclosure, the spatial size of the target object is automatically converted on the basis of the size scale information "one scale=1 km" corresponding to the virtual space A and the size scale information "one scale=1 m" corresponding to the virtual space B, which are recorded in advance in the scale information database 320. As a result, the user can move the target object without being conscious of the boundary between the virtual spaces. Hereinafter, such a technology will be described in detail.

The above is the outline of the embodiment of the present disclosure.

1. Details of Embodiment

Next, the embodiment of the present disclosure will be described in detail.

1.1. Contemplated Scenes

First, an example of a specific scene assumed in the embodiment of the present disclosure will be described.

Figure 2:
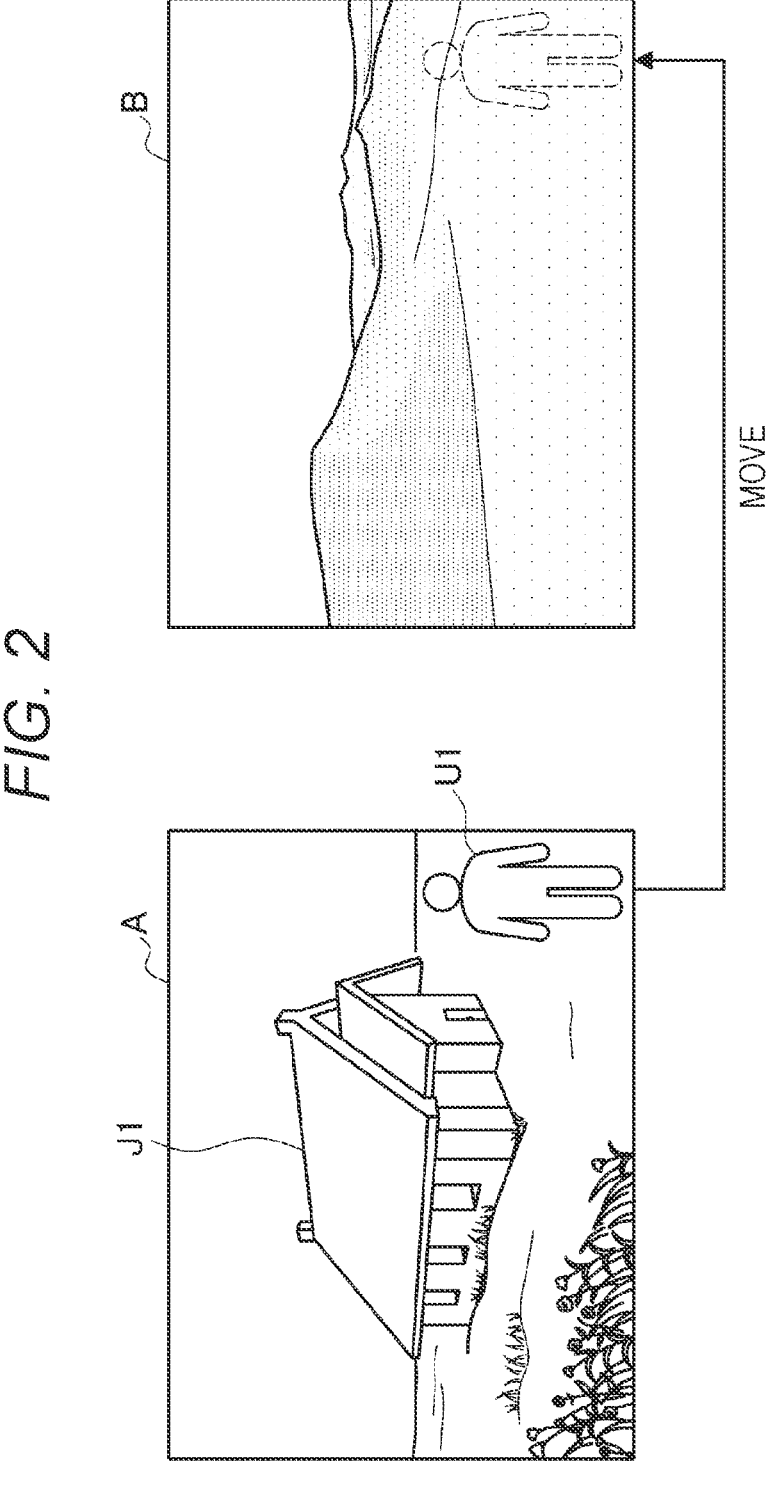
FIG. 2 is a diagram for explaining an example of a specific scene assumed in an embodiment of the present disclosure.

FIG. 2 is a diagram for explaining an example of a specific scene assumed in the embodiment of the present disclosure. Referring to FIG. 2, a virtual space A exists. In the virtual space A, an avatar U1 corresponding to the user exists. The user can input an instruction for controlling the motion of the avatar U1 while viewing the virtual space A. Note that the avatar U1 corresponds to an example of a target object (virtual object) arranged in the virtual space A.

Meanwhile, there is also a virtual space B different from the virtual space A. In the embodiment of the present disclosure, a case is mainly assumed where an instruction to move the avatar U1 from the virtual space A to the virtual space B is input by the user. In such a case, the avatar U1 moves from the virtual space A to the virtual space B according to the movement instruction.

Note that, in the virtual space A, the user can create the target object J1 as a product. The target object J1 corresponds to an example of a target object (virtual object) arranged in the virtual space A. In the example illustrated in FIG. 2, the target object J1 is a building, but the type of the target object J1 created by the user is not limited to the building.

In the modifications described later, a case where a movement instruction of the target object J1 created by the user in this manner from the virtual space A to the virtual space B is input by the user is mainly assumed. In such a case, the target object J1 moves from the virtual space A to the virtual space B according to the movement instruction.

In this way, a case is assumed where the target object moves from the virtual space A to the virtual space B on the basis of an instruction to move any target object arranged in the virtual space A to the virtual space B. At this time, the value used for the display of the avatar U1 is automatically converted on the basis of the scale information corresponding to the virtual space A and the scale information corresponding to the virtual space B. As a result, inconsistencies (that is, the discomfort of the user who views the virtual space) can be reduced.

For example, the discomfort of the user who views the virtual space is caused by a phenomenon that two objects having different sizes are displayed as the same size in reality, an object that is generally considered to be clearly small is displayed as a huge object, and although a certain operation (for example, walking of a human, and the like) is supposed to be completed within a certain period of time, the operation is not completed until later than the period of time, or the operation is completed faster than the period of time.

In the embodiment of the present disclosure, a case is mainly assumed where an instruction to move the target object from the virtual space A to the virtual space B is input by the user. However, such a movement instruction of the target object may not be input by the user. For example, the instruction to move the target object may be input by a person other than the user (for example, an administrator of the virtual space, or the like). Alternatively, occurrence of a predetermined event in the virtual space A may be treated as a movement instruction of the target object.

An example of a specific scene assumed in the embodiment of the present disclosure has been described above.

1.2. System Configuration Example

Next, a configuration example of an information processing system according to the embodiment of the present disclosure will be described.

Figure 3:
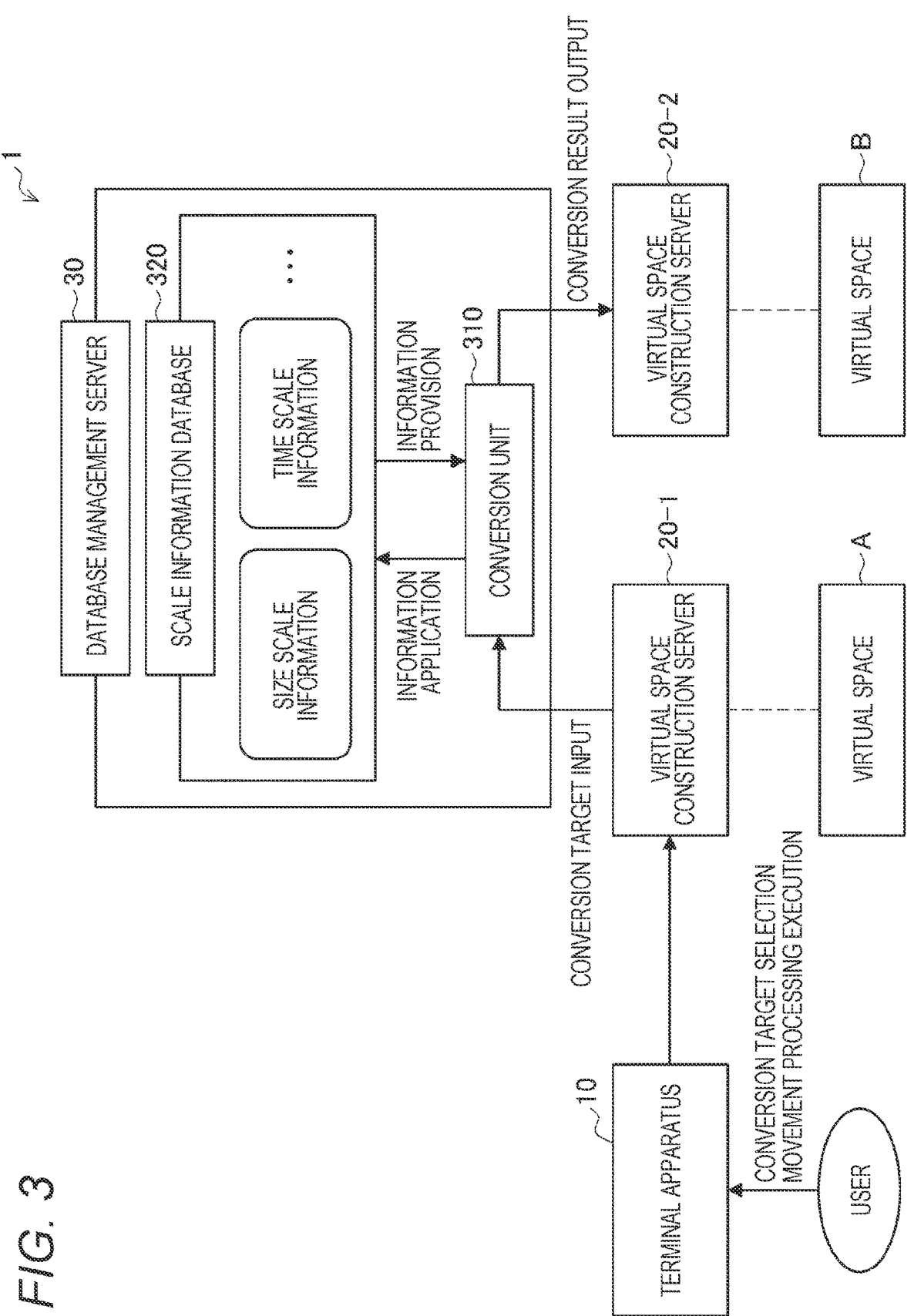
FIG. 3 is a diagram for explaining a configuration example of an information processing system according to an embodiment of the present disclosure.

FIG. 3 is a diagram for explaining a configuration example of an information processing system according to the embodiment of the present disclosure. As illustrated in FIG. 3, an information processing system 1 according to the embodiment of the present disclosure includes a terminal apparatus 10, virtual space construction servers 20-1 to 20-2, and a database management server 30.

In the following description, the virtual space construction server 20-1 (second construction apparatus) and the virtual space construction server 20-2 (first construction apparatus) may be referred to as the virtual space construction server 20 without being particularly distinguished. The number of the virtual space construction servers 20 is not limited to two, and any plural number of the virtual space construction servers 20 is only required.

(Terminal Apparatus 10)

As illustrated in FIG. 3, the terminal apparatus 10 is used by a user. In the embodiment of the present disclosure, a case where the terminal apparatus 10 is a game machine is mainly assumed. However, the form of the terminal apparatus 10 is not limited to the game machine.

For example, the terminal apparatus 10 may be an augmented reality (AR) device (such as AR glasses as an example) worn on the body of the user. Alternatively, the terminal apparatus 10 may be a wearable device (such as a virtual reality (VR) device as an example) other than the AR device. Alternatively, the terminal apparatus 10 may be an apparatus other than the wearable device (such as a smartphone, a smart watch, or a personal computer (PC) as an example).

The terminal apparatus 10 can access a virtual space A constructed by the virtual space construction server 20-1 via a network (not illustrated) on the basis of a login operation by the user designating the virtual space construction server 20-1. In the virtual space A, an avatar corresponding to the user exists, and the user may input an instruction for controlling the motion of the avatar by input to the terminal apparatus 10.

Similarly, the terminal apparatus 10 can access a virtual space B constructed by the virtual space construction server 20-2 via a network (not illustrated) on the basis of a login operation by the user designating the virtual space construction server 20-2. In the virtual space B, an avatar corresponding to the user exists, and the user may input an instruction for controlling the motion of the avatar by input to the terminal apparatus 10.

Figure 4:
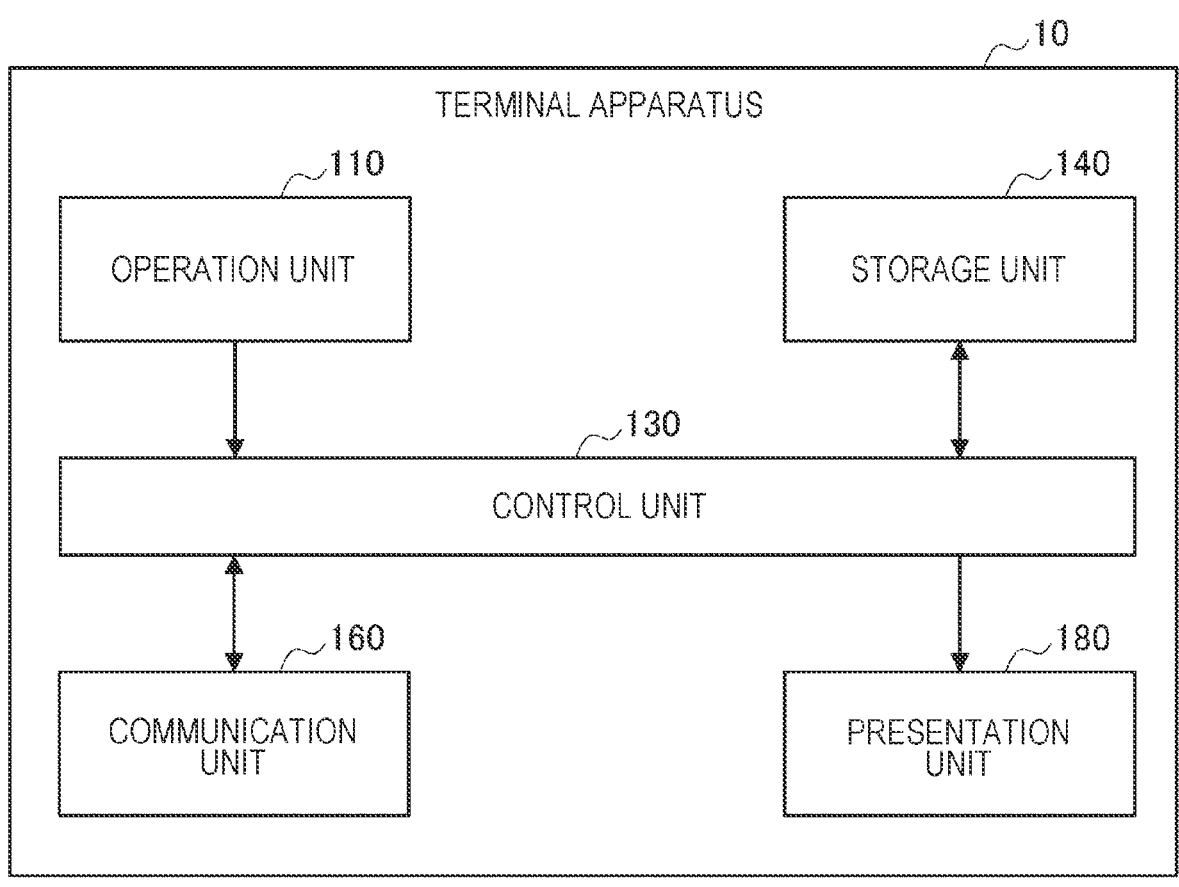
FIG. 4 is a diagram illustrating a functional configuration example of a terminal apparatus.

FIG. 4 is a diagram illustrating a functional configuration example of the terminal apparatus 10. As illustrated in FIG. 4, the terminal apparatus 10 includes an operation unit 110, a control unit 130, a storage unit 140, a communication unit 160, and a presentation unit 180.

(Operation Unit 110)

The operation unit 110 has a function of accepting an operation input by the user. Here, a case where the operation unit 110 is configured by a controller (for example, a game controller) is mainly assumed. However, the operation unit 110 is not limited to the controller. For example, the operation unit 110 may include an input device such as a mouse, a keyboard, a touch panel, or a microphone. The operation accepted by the operation unit 110 is transmitted to the virtual space construction server 20-1 or 20-2 designated by the user.

The controller not only includes a button but also includes a sensor that detects a motion of the user. The detection result for the motion of the user is continuously transmitted to the virtual space construction server 20-1 or 20-2 that constructs the virtual space to which the user is being logged in. In the embodiment of the present disclosure, a case where the acceleration of a predetermined part of the body (such as an arm or a hand as an example) of the user is detected by an acceleration sensor as an example of the motion of the user is mainly assumed. However, the sensor may detect a motion other than acceleration. For example, the angular velocity of a predetermined part of the body of the user U1 may be detected by a gyro sensor as an example of the motion of the user.

(Control Unit 130)

The control unit 130 includes, for example, one or a plurality of central processing units (CPUs) and the like. In a case where the control unit 130 includes a processing apparatus such as a CPU, the processing apparatus may include an electronic circuit. The control unit 130 can be implemented by the processing apparatus executing a program.

(Storage Unit 140)

The storage unit 140 is a recording medium that has a configuration including a memory and, for example, stores a program to be executed by the control unit 130 and the data necessary for executing this program. In addition, the storage unit 140 temporarily stores data for calculation by the control unit 130. The storage unit 140 includes a magnetic storage device, a semiconductor storage device, an optical storage device, a magneto-optical storage device, or the like.

(Communication Unit 160)

The communication unit 160 includes a communication interface. For example, the communication unit 160 communicates with the virtual space construction server 20-1 via a network (not illustrated), or communicates with the virtual space construction server 20-2 via a network (not illustrated).

(Presentation Unit 180)

The presentation unit 180 presents various kinds of information to the user, under the control of the control unit 130. For example, the presentation unit 180 can include a display. At this time, the display may be a transmissive display capable of visually recognizing a real-world image, an optical see-through display, or a video see-through display. Alternatively, the display may be a non-transmissive display that presents a virtual world image having a three-dimensional structure corresponding to the real world, instead of the real-world image.

The transmissive display is mainly used for augmented reality (AR), and the non-transmissive display is mainly used for virtual reality (VR). Furthermore, the presentation unit 180 can also include an X reality (XR) display used for both of the AR and VR purposes. For example, the presentation unit 180 performs AR display or VR display of the virtual object, or UI display of text or the like.

Note that the presentation of various kinds of information by the presentation unit 180 may be performed by voice presentation by a speaker, may be performed by haptic presentation by a haptic presentation apparatus, or may be performed by another presentation device.

Returning to FIG. 3, the configuration example of the information processing system 1 will be continued.

(Virtual Space A)

The virtual space A is constructed by the virtual space construction server 20-1. The user can log in to the virtual space A, and other users can also log in to the virtual space A. That is, a large number of users can log in to the virtual space A using their avatars. In a case where the user is being logged in to the virtual space A, the virtual space A is provided to the terminal apparatus 10 from the virtual space construction server 20-1, and the virtual space A is presented to the user by the presentation unit 180 of the terminal apparatus 10.

(Virtual Space B)

Similarly, the virtual space B is constructed by the virtual space construction server 20-2. The user can log in to the virtual space B, and other users can also log in to the virtual space B. That is, a large number of users can log in to virtual space B using their avatars. In a case where the user is being logged in to the virtual space B, the virtual space B is provided to the terminal apparatus 10 from the virtual space construction server 20-2, and the virtual space B is presented to the user by the presentation unit 180 of the terminal apparatus 10.

Note that, in the embodiment of the present disclosure, two virtual spaces A and B will be given as an example of the virtual spaces to which the user is allowed to log in and described. However, the number of virtual spaces to which the user is allowed to log in is not limited to two. For example, the number of virtual spaces to which the user is allowed to log in may be three or more.

Hereinafter, a functional configuration example of each of the virtual space construction server 20 and the database management server 30 will be described with reference to FIG. 3.

(Virtual Space Construction Server 20)

The virtual space construction server 20 can be implemented by a computer. The virtual space construction server 20 is connected to a network (not illustrated) using a communication interface (not illustrated), and can communicate with each of the terminal apparatus 10 and the database management server 30 via the network (not illustrated) using the communication interface (not illustrated).

The virtual space construction server 20 includes a storage unit (not illustrated). The storage unit (not illustrated) is a recording medium that has a configuration including a memory and, for example, stores a program to be executed by a control unit (not illustrated) and the data necessary for executing this program. Furthermore, the storage unit (not illustrated) temporarily stores data for calculation performed by the control unit (not illustrated). The storage unit (not illustrated) includes a magnetic storage device, a semiconductor storage device, an optical storage device, a magneto-optical storage device, or the like.

The virtual space construction server 20 further includes the control unit (not illustrated). The control unit (not illustrated) may be configured by, for example, one or a plurality of CPUs or the like. In a case where the control unit (not illustrated) is configured by a processing apparatus such as a CPU, the processing apparatus may be configured by an electronic circuit. The control unit (not illustrated) can be implemented by a program executed by the processing apparatus.

(Database Management Server 30)

The database management server 30 can be implemented by a computer. The database management server 30 is connected to a network (not illustrated) using a communication interface (not illustrated), and can communicate with the virtual space construction server 20 via the network (not illustrated) using the communication interface (not illustrated).

The database management server 30 includes a storage unit (not illustrated). The storage unit (not illustrated) is a recording medium that has a configuration including a memory and, for example, stores a program to be executed by a control unit (not illustrated) and the data necessary for executing this program. Furthermore, the storage unit (not illustrated) temporarily stores data for calculation performed by the control unit (not illustrated). The storage unit (not illustrated) includes a magnetic storage device, a semiconductor storage device, an optical storage device, a magneto-optical storage device, or the like. The storage unit (not illustrated) includes the scale information database 320.

As illustrated in FIG. 3, the scale information database 320 has size scale information and time scale information as an example of the scale information. However, the scale information included in the scale information database 320 is not limited to such an example. The scale information database 320 has scale information corresponding to the virtual space A and scale information corresponding to the virtual space B.

Further, the database management server 30 includes a control unit (not illustrated). The control unit (not illustrated) may be configured by, for example, one or a plurality of CPUs or the like. In a case where the control unit (not illustrated) is configured by a processing apparatus such as a CPU, the processing apparatus may be configured by an electronic circuit. The control unit (not illustrated) can be implemented by a program executed by the processing apparatus. The control unit (not illustrated) includes a conversion unit 310.

A specific function of the conversion unit 310 will be described in detail later. Note that the conversion unit 310 can be implemented by executing a predetermined program (conversion program) by the processing apparatus in the database management server 30.

In addition, in the embodiment of the present disclosure, a case is mainly assumed where the conversion unit 310 is present in the database management server 30 that holds the scale information database 320. However, the place where the conversion unit 310 is present is not limited to the database management server 30. For example, the conversion unit 310 may exist in the virtual space construction server 20-1 or the virtual space construction server 20-2, or may exist in a computer prepared exclusively for executing the conversion program.

The configuration example of the information processing system 1 according to the embodiment of the present disclosure has been described above.

(Scale Conversion Processing)

Next, the scale conversion processing executed by the information processing system 1 according to the embodiment of the present disclosure will be described with reference to FIG. 5.

FIG. 5 is a flowchart illustrating an operation example of scale conversion processing executed by the information processing system 1 according to the embodiment of the present disclosure. First, the terminal apparatus 10 accesses the virtual space A constructed by the virtual space construction server 20-1 via a network (not illustrated) on the basis of a login operation by the user designating the virtual space construction server 20-1. The virtual space construction server 20-1 provides a service to the terminal apparatus corresponding to the user in the virtual space A in which the user is logged in.

At this time, the virtual space construction server 20-1 holds a value (for example, the spatial size of the target object, the FPS of the target object, and the like) used for displaying the target object. Then, the virtual space construction server 20-1 arranges the target object in the virtual space A on the basis of the value used to display the target object. The virtual space A in which the target object is arranged in this manner is provided from the virtual space construction server 20-1 to the terminal apparatus 10 and presented to the user by the terminal apparatus 10.

Here, in the terminal apparatus 10, an instruction to move the target object from the virtual space A to the virtual space B is input by the user. More specifically, a case is assumed where a target object (here, the avatar) existing in the virtual space A is selected by the user as the movement target, and the virtual space B is selected by the user as the virtual space as the movement destination. In such a case, the virtual space construction server 20-1 recognizes the value used to display the selected target object as the conversion target OBJ (S11), recognizes the virtual space A where the target object exists as the virtual space MA of the movement source (S12), and recognizes the selected virtual space B as the virtual space MB of the movement destination (S13).

Note that the instruction to move the target object from the virtual space A to the virtual space B may be input by a person other than the user. For example, such an instruction may be input by an administrator of the virtual space. As an example, the movement instruction may be input by the administrator in a case where it is necessary to move one or a plurality of users logged in the virtual space of the movement source to the virtual space of the movement destination due to occurrence of a predetermined event in the virtual space of the movement source or the like. Alternatively, occurrence of a predetermined event in the virtual space A may be treated as a movement instruction of the target object.

The virtual space construction server 20-1 notifies the database management server 30 of the conversion target, the selected target object, the virtual space of the movement source, and the virtual space of the movement destination (S14).

In the database management server 30, the conversion unit 310 calculates the conversion parameter C (conversion value) on the basis of the instruction to move the target object from the virtual space A to the virtual space B (S15). More specifically, the conversion unit 310 acquires at least the scale information in the virtual space of the movement destination from the scale information database 320, and calculates the conversion parameter C on the basis of the acquired scale information in the virtual space of the movement destination.

Here, a case is assumed where the conversion unit 310 acquires the scale information in the virtual space of the movement destination and the scale information in the virtual space of the movement source from the scale information database 320, and calculates the conversion parameter C on the basis of the acquired scale information in the virtual space of the movement destination and the scale information in the virtual space of the movement source.

However, as described in the subsequent modifications, the scale information in the virtual space of the movement source is not necessarily used for calculating the conversion parameter c.

Then, the conversion unit 310 converts the conversion target on the basis of the calculated conversion parameter C to obtain a conversion result (converted value).

More specifically, the conversion unit 310 acquires the scale information in the virtual space of the movement source notification of which is provided from the virtual space construction server 20-1 from the scale information database 320, and acquires the scale information in the virtual space of the movement destination notification of which is provided from the virtual space construction server 20-1 from the scale information database 320. Then, the conversion unit 310 calculates a ratio of the scale information in the virtual space of the movement source to the scale information in the virtual space of the movement destination as the conversion parameter C.

For example, in a case where the scale information in the virtual space of the movement source is "one scale=1 m" and the scale information in the virtual space of the movement destination is "one scale=1 cm", the conversion unit 310 calculates a ratio="1/0.01=100" of the scale information "one scale=1 cm" in the virtual space of the movement destination to the scale information "0.01 scale=1 cm" in the virtual space of the movement source as the conversion parameter C.

The conversion unit 310 obtains a conversion result (converted value) by multiplying the conversion target OBJ notification of which is provided from the virtual space construction server 20-1 by the conversion parameter C (S16). The conversion unit 310 notifies the virtual space construction server 20-1 of the logout instruction of the target object, and notifies the virtual space construction server 20-2 of the login instruction of the target object and the conversion result.

The virtual space construction server 20-1 logs out the target object from the virtual space A on the basis of the logout instruction of the target object notification of which is provided from the conversion unit 310 (S17). Furthermore, the virtual space construction server 20-2 causes the target object to log in to the virtual space B on the basis of the login instruction of the target object notification of which is provided from the conversion unit 310 (S18). At this time, the virtual space construction server 20-2 controls the display of the target object in the virtual space as the movement destination on the basis of the conversion result notification of which is provided from the conversion unit 310.

For example, in a case where the conversion result notification of which is provided from the conversion unit 310 is the spatial size of the target object, the virtual space construction server 20-2 may match the spatial size of the target object in the virtual space as the movement destination with the spatial size of the target object notification of which is provided from the conversion unit 310. Alternatively, in a case where the conversion result notification of which is provided from the conversion unit 310 is the FPS of the target object, the virtual space construction server 20-2 may match the FPS of the target object in the virtual space as the movement destination with the FPS of the target object notification of which is provided from the conversion unit 310.

The virtual space construction server 20-2 calculates coordinates of the target object in the virtual space B (S19), and moves the target object to the calculated coordinates (S20). The virtual space B in which the target object is arranged in this manner is provided from the virtual space construction server 20-2 to the terminal apparatus 10 and presented to the user by the terminal apparatus 10. At this time, since the value used to display the target object in the virtual space B is automatically converted by the conversion unit 310, the discomfort given to the user when the target object moves from the virtual space A to the virtual space B can be reduced.

Note that, in the embodiment of the present disclosure, the spatial size of the target object and the FPS of the target object will be described as an example of the value used to display the target object. However, the value used to display the target object is not limited to these examples. Other examples of the value used to display the target object will be described in later modifications.

The scale conversion processing executed by the information processing system 1 according to the embodiment of the present disclosure has been described above.

Here, as a management method of the scale information database 320, various management methods can be assumed. For example, as a management method of the scale information database 320, there is a form in which the scale information database 320 is managed by a server different from both the virtual space construction server 20-1 and the virtual space construction server 20-2 (hereinafter, also referred to as a "centralized type"). In addition, as another management method of the scale information database 320, there is a form in which the scale information database 320 is managed in a distributed manner in a plurality of virtual space construction servers 20 (hereinafter, also referred to as a "distributed management type").

Hereinafter, a centralized management method will be described as a management method of the scale information database 320, and then a distributed management method will be described as another management method of the scale information database 320.

1.3. Centralized Management Method

Figure 6:
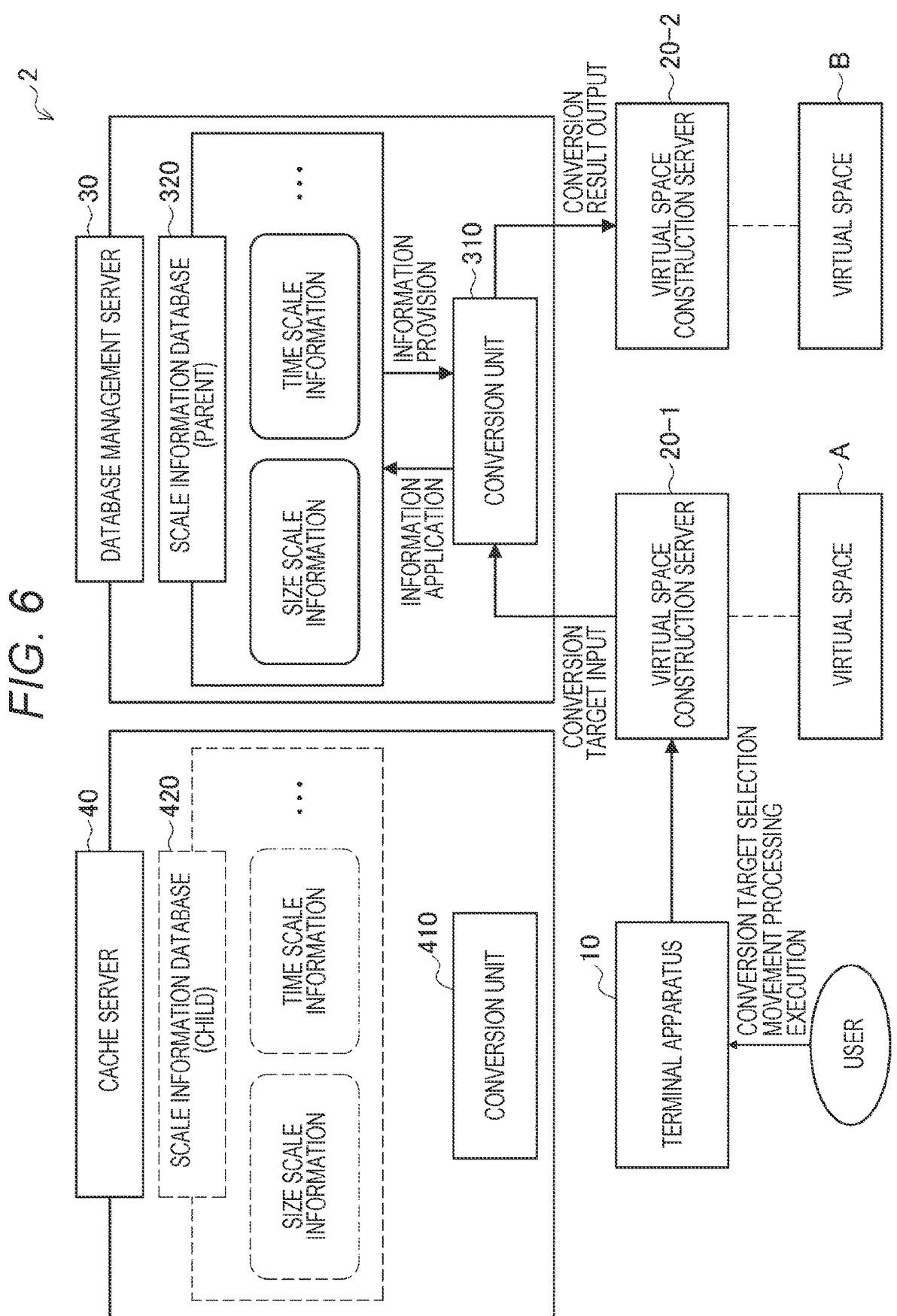
FIG. 6 is a diagram illustrating a configuration example of an information processing system using a centralized management method.

FIG. 6 is a diagram illustrating a configuration example of an information processing system using a centralized management method. As illustrated in FIG. 6, the information processing system 2 using the centralized management method includes a terminal apparatus 10, virtual space construction servers 20-1 to 20-2, a database management server 30, and a cache server 40.

The database management server 30 is a server different from both the virtual space construction server 20-1 and the virtual space construction server 20-2, functions as a parent server, and stores a scale information database (parent) 320. The scale information database (parent) 320 stores scale information corresponding to each of the virtual space A and the virtual space B. The scale information has size scale information and time scale information.

(Cache Server 40)

The cache server 40 can be implemented by a computer. The cache server 40 is connected to a network (not illustrated) using a communication interface (not illustrated), and can communicate with each of the database management server 30, the virtual space construction server 20-1, and the virtual space construction server 20-2 via the network (not illustrated) using the communication interface (not illustrated).

The cache server 40 includes a storage unit (not illustrated). The storage unit (not illustrated) is a recording medium that has a configuration including a memory and, for example, stores a program to be executed by a control unit (not illustrated) and the data necessary for executing this program. Furthermore, the storage unit (not illustrated) temporarily stores data for calculation performed by the control unit (not illustrated). The storage unit (not illustrated) includes a magnetic storage device, a semiconductor storage device, an optical storage device, a magneto-optical storage device, or the like. The storage unit (not illustrated) includes a scale information database (child) 420.

Furthermore, the cache server 40 includes a control unit (not illustrated). The control unit (not illustrated) may be configured by, for example, one or a plurality of CPUs or the like. In a case where the control unit (not illustrated) is configured by a processing apparatus such as a CPU, the processing apparatus may be configured by an electronic circuit. The control unit (not illustrated) can be implemented by a program executed by the processing apparatus. The control unit (not illustrated) includes a conversion unit 410 having a similar function to the conversion unit 310.

The cache server 40 is a server that contributes to shortening of an access time to data. As illustrated in FIG. 6, the cache server 40 records a copy of the data recorded in the scale information database (parent) 320 by the database management server 30 in the scale information database (child) 420. In the example illustrated in FIG. 6, the cache server 40 is provided as an independent server constructed for the purpose of the cache function. However, as will be described later, the place where the cache server 40 is provided is not limited.

For example, a case where a new virtual space is constructed is assumed. In such a case, the new virtual space construction server constructing the new virtual space makes an application for the database management server 30 to acquire information. Then, in a case where the application is accepted by the database management server 30, the new virtual space construction server can acquire the conversion result. The database management server 30 may hold a table indicating whether the conversion result can be provided to each virtual space construction server.

(Scale Conversion Processing)

Next, scale conversion processing executed by the information processing system 2 using a centralized management method will be described with reference to FIG. 7.

Figure 7:
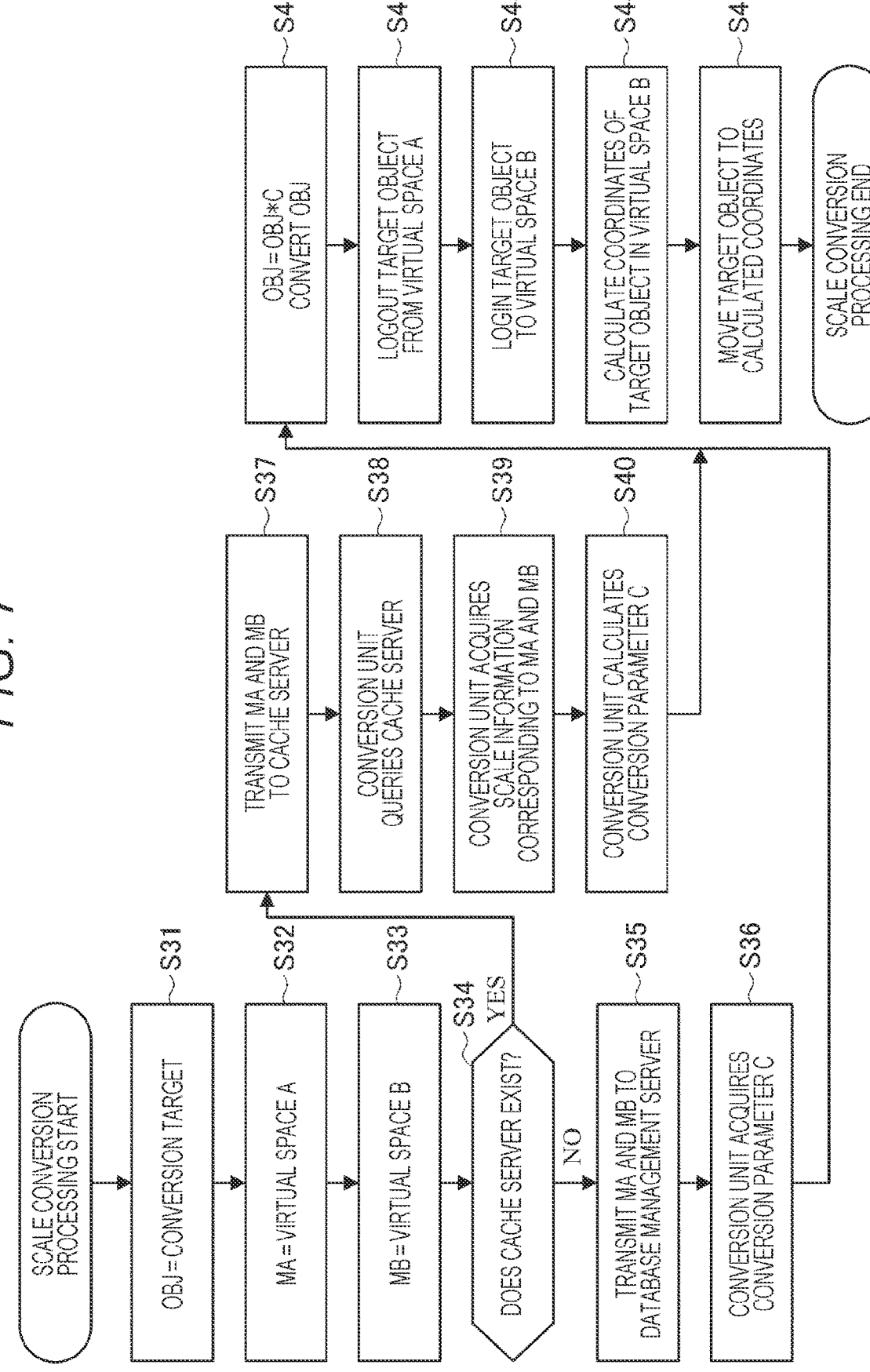
FIG. 7 is a flowchart illustrating an operation example of scale conversion processing executed by an information processing system using a centralized management method.

FIG. 7 is a flowchart illustrating an operation example of scale conversion processing executed by the information processing system 2 using a centralized management method. First, similarly to S11 to S13 (FIG. 5), S31 to S33 are executed.

In a case where the cache server 40 does not exist ("NO" in S34), the virtual space construction server 20-1 executes S35 and S36 similarly to S14 and S15 (FIG. 5). On the other hand, in a case where the cache server 40 exists ("YES" in S34), the virtual space construction server 20-1 notifies the cache server 40 of the conversion target, the selected target object, the virtual space of the movement source, and the virtual space of the movement destination (S37).

In the cache server 40, the conversion unit 410 calculates the conversion parameter C (conversion value) on the basis of the instruction to move the target object from the virtual space A to the virtual space B. More specifically, the conversion unit 410 acquires at least the scale information in the virtual space of the movement destination from the scale information database (child) 420 of the cache server 40, and calculates the conversion parameter C on the basis of the acquired scale information in the virtual space of the movement destination.

Here, a case where the conversion unit 410 acquires scale information in the virtual space as the movement destination and scale information in the virtual space as the movement source from the scale information database (child) 420 is assumed (S38 and S39). Then, a case is assumed where the conversion unit 410 calculates the conversion parameter C on the basis of the acquired scale information in the virtual space of the movement destination and scale information in the virtual space of the movement source. More specifically, the conversion unit 410 calculates a ratio of the scale information in the virtual space of the movement destination to the scale information in the virtual space of the movement source as the conversion parameter C (S40).

Then, the conversion unit 410 converts the conversion target OBJ on the basis of the calculated conversion parameter C to obtain a conversion result (converted value). More specifically, the conversion unit 310 obtains a conversion result by multiplying the conversion target OBJ notification of which is provided from the virtual space construction server 20-1 by the conversion parameter C (S41). The conversion unit 410 notifies the virtual space construction server 20-1 of the logout instruction of the target object, and notifies the virtual space construction server 20-2 of the login instruction of the target object and the conversion result.

Subsequently, similarly to S17 to S20 (FIG. 5), S42 to S45 are executed.

The scale conversion processing executed by the information processing system 2 using the centralized management method has been described above.

(Update of Scale Information)

Next, updating of scale information executed by the information processing system 2 using a centralized management method will be described with reference to FIG. 8.

Figure 8:
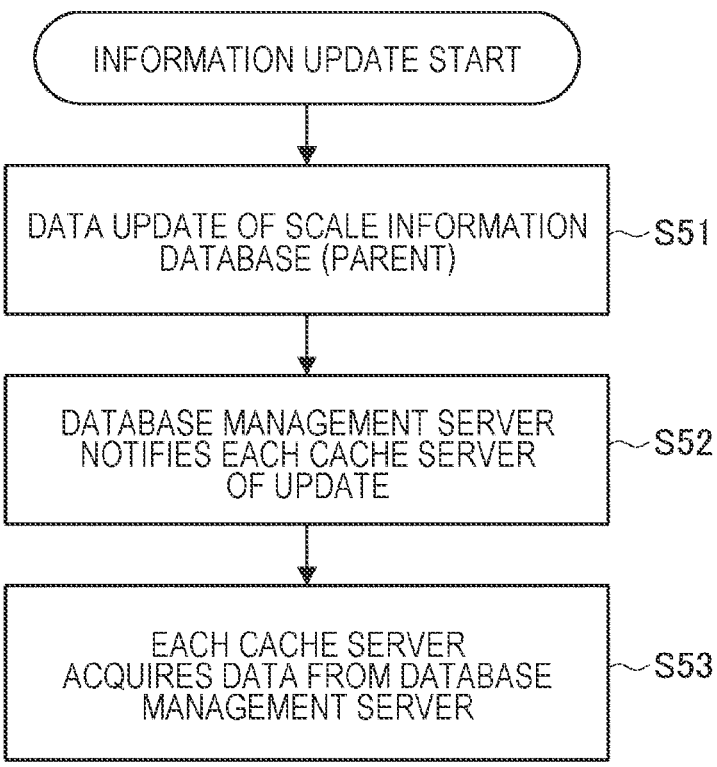
FIG. 8 is a flowchart illustrating an operation example of updating scale information executed by an information processing system using a centralized management method.

FIG. 8 is a flowchart illustrating an operation example of updating scale information executed by the information processing system 2 using a centralized management method. First, it is assumed that there is a virtual space construction server in which the scale information in the virtual space constructed by itself is changed. In such a case, the virtual space construction server makes an application for updating the scale information in the virtual space constructed by itself to the database management server 30.

In a case of accepting the update application, the database management server 30 updates the scale information in the virtual space among the scale information recorded in the scale information database (parent) 320 (S51). At this time, the database management server 30 notifies the cache server 40 of the update of the scale information (S52). When notified of the update of the scale information, the cache server 40 acquires the updated scale information from the scale information database (parent) 320 (S53), and updates the scale information recorded in the scale information database (child) 420 on the basis of the updated scale information.

The updating of the scale information executed by the information processing system 2 using the centralized management method has been described above.

Advantages

According to the centralized management method, in a case where the scale information recorded in the scale information database (parent) 320 is updated, the virtual space construction server 20 can be immediately notified of the update of the scale information. Further, according to the centralized management method, it is easy to manage access to the scale information stored by the database management server 30 or the cache server 40. As a result, it can be expected that it is easy to prevent intervention of a malicious person.

The centralized management method has been described above.

1.4. Distributed Management Method

Figure 9:
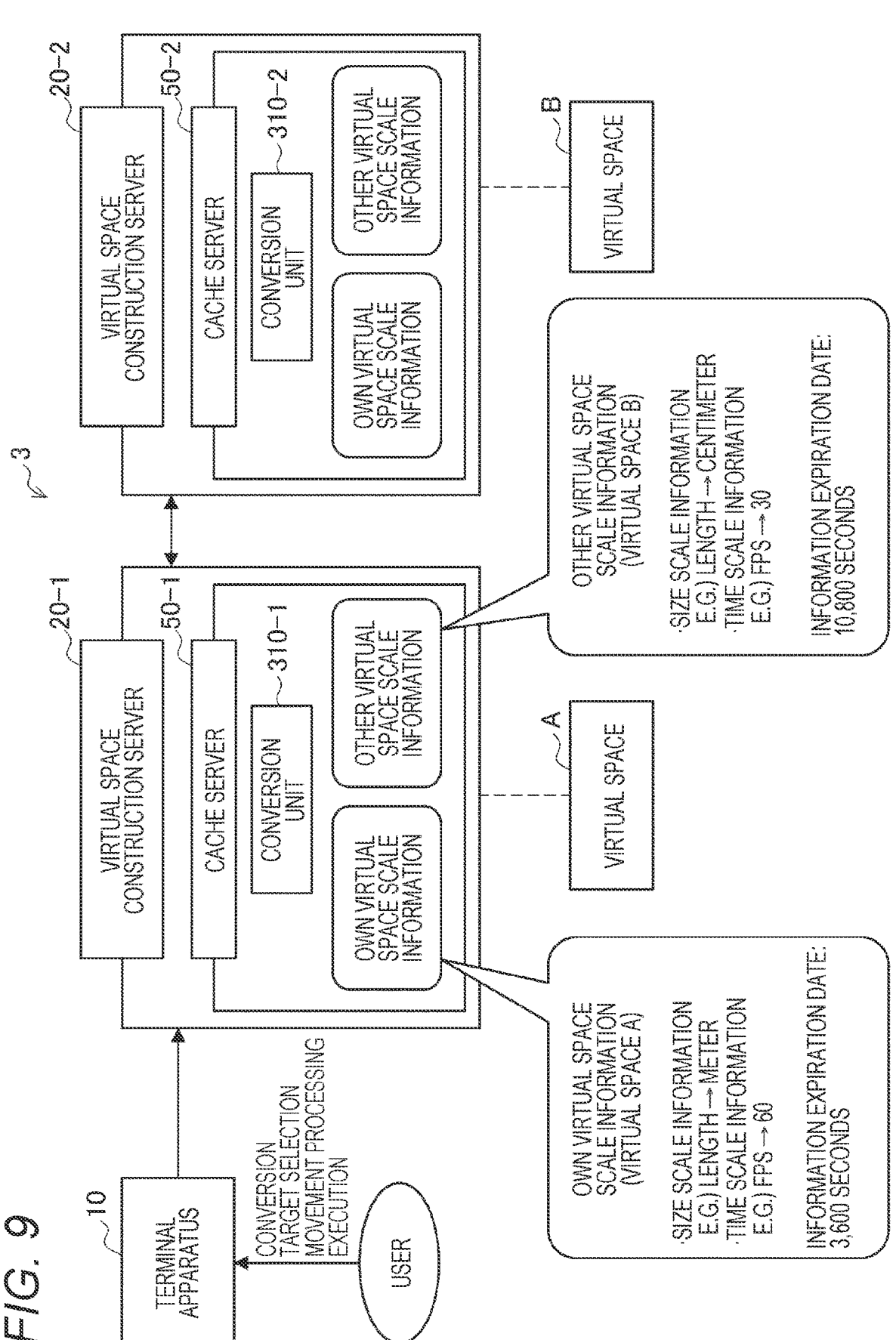
FIG. 9 is a diagram illustrating a configuration example of an information processing system using a distributed management method.

FIG. 9 is a diagram illustrating a configuration example of an information processing system using a distributed management method. As illustrated in FIG. 9, the information processing system 3 using a distributed management method includes a terminal apparatus 10 and virtual space construction servers 20-1 to 20-2. The virtual space construction server 20-1 includes a cache server 50-1, and the virtual space construction server 20-2 includes a cache server 50-2.
(Cache Server 50-1)

The cache server 50-1 includes a conversion unit 310-1, stores the scale information corresponding to its own virtual space (that is, the virtual space A) as "own virtual space scale information", and stores the scale information corresponding to another virtual space (that is, the virtual space B) as "other virtual space scale information". In this manner, the cache server 50-1 stores both the scale information in the virtual space A and the scale information in the virtual space B.

The "own virtual space scale information" stored in the cache server 50-1 includes "size scale information" and "time scale information". Further, "information expiration date" which is an expiration date of the scale information is attached to the "own virtual space scale information". In addition, the "other virtual space scale information" stored in the cache server 50-1 includes "size scale information" and "time scale information". Further, "information expiration date" which is an expiration date of the scale information is attached to the "other virtual space scale information".

Here, the "information expiration date" changes so that the elapsed time from the previous update is grasped. Here, a case is assumed where the "information expiration date" is updated to a predetermined value at the update timing, the "information expiration date" is subtracted with the lapse of time from the update, and the information expiration date is treated as having arrived in a case where the "information expiration date" becomes 0.
(Cache Server 50-2)

The cache server 50-2 includes the conversion unit 310-2, stores the scale information corresponding to its own virtual space (that is, the virtual space B) as "own virtual space scale information", and stores the scale information corresponding to another virtual space (that is, the virtual space A) as "other virtual space scale information". As described above, the cache server 50-2 stores the same information as the scale information in the virtual space A and the scale information in the virtual space B.

Similarly to the cache server 50-1, the "own virtual space scale information" stored in the cache server 50-2 includes "size scale information" and "time scale information". Further, "information expiration date" which is an expiration date of the scale information is attached to the "own virtual space scale information" stored in the cache server 50-2.
(Scale Conversion Processing)

Next, the scale conversion processing executed by the information processing system 3 using a distributed management method will be described with reference to FIG. 10.

FIG. 10 is a flowchart illustrating an operation example of scale conversion processing executed by the information processing system 3 using a distributed management method. First, similarly to S11 to S13 (FIG. 5), S51 to S53 are executed.

In the virtual space construction server 20-1, the conversion unit 310-1 acquires the scale information in the own virtual space (that is, the virtual space of the movement source) and the scale information in the virtual space as the movement destination from the cache server 50-1 of the own server (S54).

The conversion unit 310-1 calculates a conversion parameter C (conversion value) on the basis of an instruction to move the target object from the virtual space A to the virtual space B. Calculation of the conversion parameter C is executed in a similar manner to S15 (FIG. 5) (S55). Thereafter, similarly to S16 to S20 (FIG. 5), S56 to S60 are executed.

The scale conversion processing executed by the information processing system 3 using the distributed management method has been described above.
(Update of Scale Information)

Next, the update of the scale information executed by the information processing system 3 using the distributed management method will be described with reference to FIG. 11.

FIG. 11 is a flowchart illustrating an operation example of updating scale information executed by the information processing system 3 using a distributed management method. First, it is assumed that the information expiration date (that is, the information expiration date of the scale information in the virtual space B) of the "other virtual space scale information" stored in the virtual space construction server 20-1 constructing the virtual space A has arrived. At this time, the virtual space construction server 20-1 accesses the virtual space construction server 20-2 in which the information expiration date of the scale information has arrived (S71).

A case is assumed where the cache server 50-2 of the virtual space construction server 20-2 updates the "own virtual space scale information" (that is, the scale information in the virtual space B) stored by itself ("YES" in S72). In such a case, the virtual space construction server 20-1 acquires the updated scale information from the cache server 50-2, and updates the "other virtual space scale information" of the cache server 50-1 in the own server with the acquired updated scale information (new information) (S73).

Then, the virtual space construction server 20-1 updates the information expiration date of the "other virtual space scale information" (S74). On the other hand, a case is assumed where the cache server 50-2 of the virtual space construction server 20-2 has not updated the "own virtual space scale information" stored by itself ("NO" in S72). In such a case, the virtual space construction server 20-1 updates the information expiration date of the "other virtual space scale information" (S74).

The update of the scale information executed by the information processing system 3 using the distributed management method has been described above.

Advantages

An advantage of the distributed management method is high failure tolerance. According to the distributed management method, even if a failure occurs in a part of the virtual space construction servers among the plurality of virtual space construction servers, the scale information in the virtual space corresponding to the part of the virtual space construction servers transmitted to the other virtual space construction servers before the occurrence of the failure remains. Therefore, according to the distributed management method, data recovery, construction of an alternative server, securing of redundancy, and the like are easy.

The distributed management method has been described above.

2. Various Modifications

Various possible modifications will be described below.

2.1. Modification 1

Next, Modification 1 of the embodiment of the present disclosure will be described.

In the above description, a case where an instruction to move the avatar U1 (FIG. 2) from the virtual space A to the virtual space B is input by the user has been mainly assumed. However, as described above, the target object moving from the virtual space A to the virtual space B is not limited to the avatar U1. For example, the target object moving from the virtual space A to the virtual space B may be a target object created by the user in the virtual space A.

Figure 12:
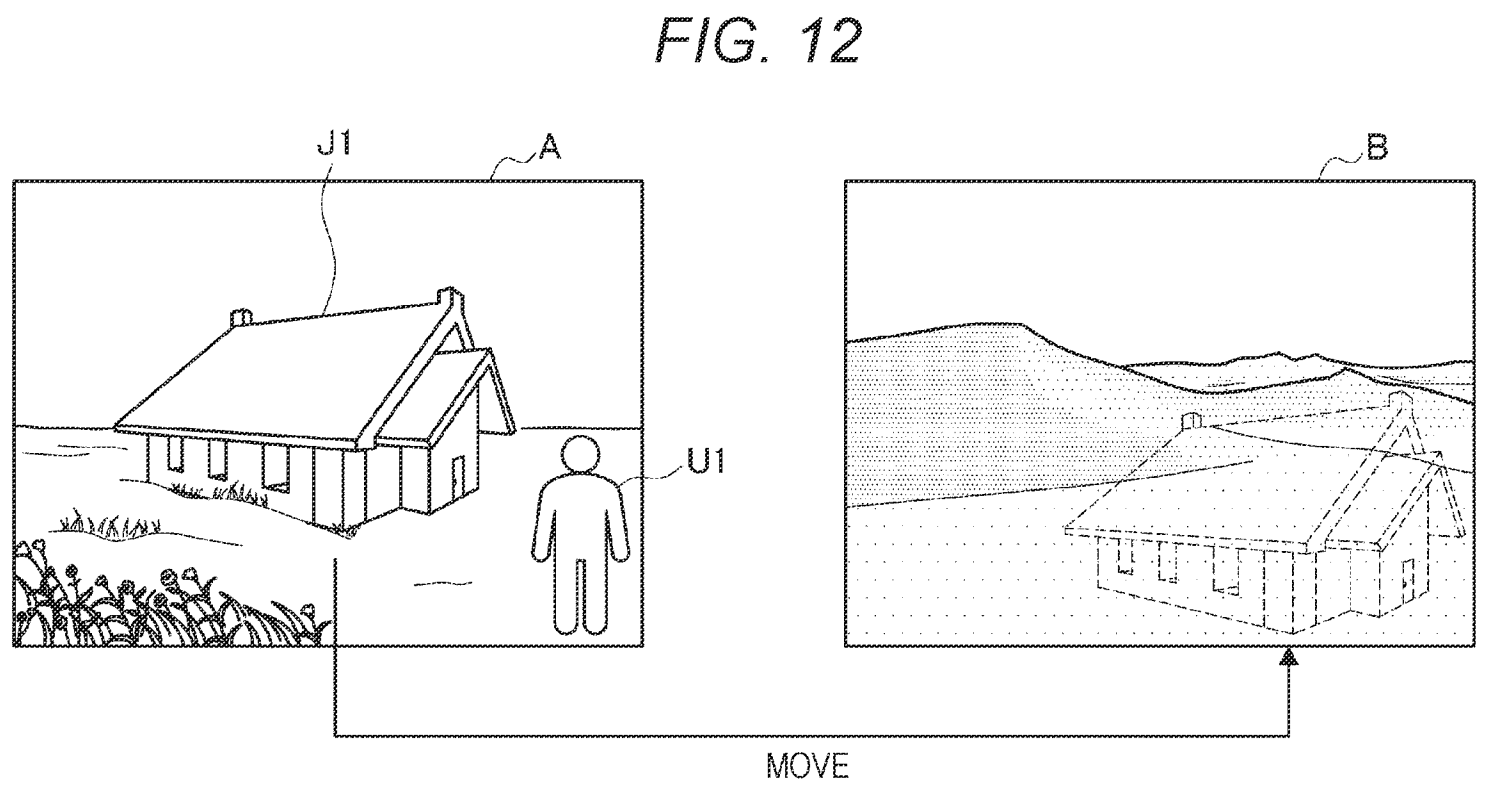

FIG. 12 is a diagram for explaining Modification 1 of the embodiment of the present disclosure. Referring to FIG. 12, a virtual space A exists similarly to the example illustrated in FIG. 2. In the virtual space A, an avatar U1 corresponding to the user exists. There is also a virtual space B different from the virtual space A.

In the virtual space A, the user can create the target object J1 as a product. In Modification 1 of the embodiment of the present disclosure, a case is mainly assumed where an instruction to move the target object J1 from the virtual space A to the virtual space B is input by the user. In such a case, the target object J1 moves from the virtual space A to the virtual space B according to the movement instruction.

Note that, even in a case where the target object J1 created by the user moves, various types of processing may be executed similarly to the case where the avatar U1 moves. That is, even in a case where the target object J1 created by the user moves, the calculation of the conversion parameter C, the conversion of the value used to display the target object J1 arranged in the virtual space A, the arrangement of the target object J1 in the virtual space B based on the conversion result, and the like may be executed, similarly to the case where the avatar U1 moves.

Modification 1 of the embodiment of the present disclosure has been described above.

2.2. Modification 2

Next, Modification 2 of the embodiment of the present disclosure will be described.

In the above description, the case where the target object moves from the virtual space A in which the user is logging in to another virtual space B has been described. However, the target object may move from another virtual space B to the virtual space A in which the user is logging in. At this time, the target object moving from the other virtual space B to the virtual space A in which the user is logging in may be a video of the other virtual space B (for example, a two-dimensional video).

Figure 13:
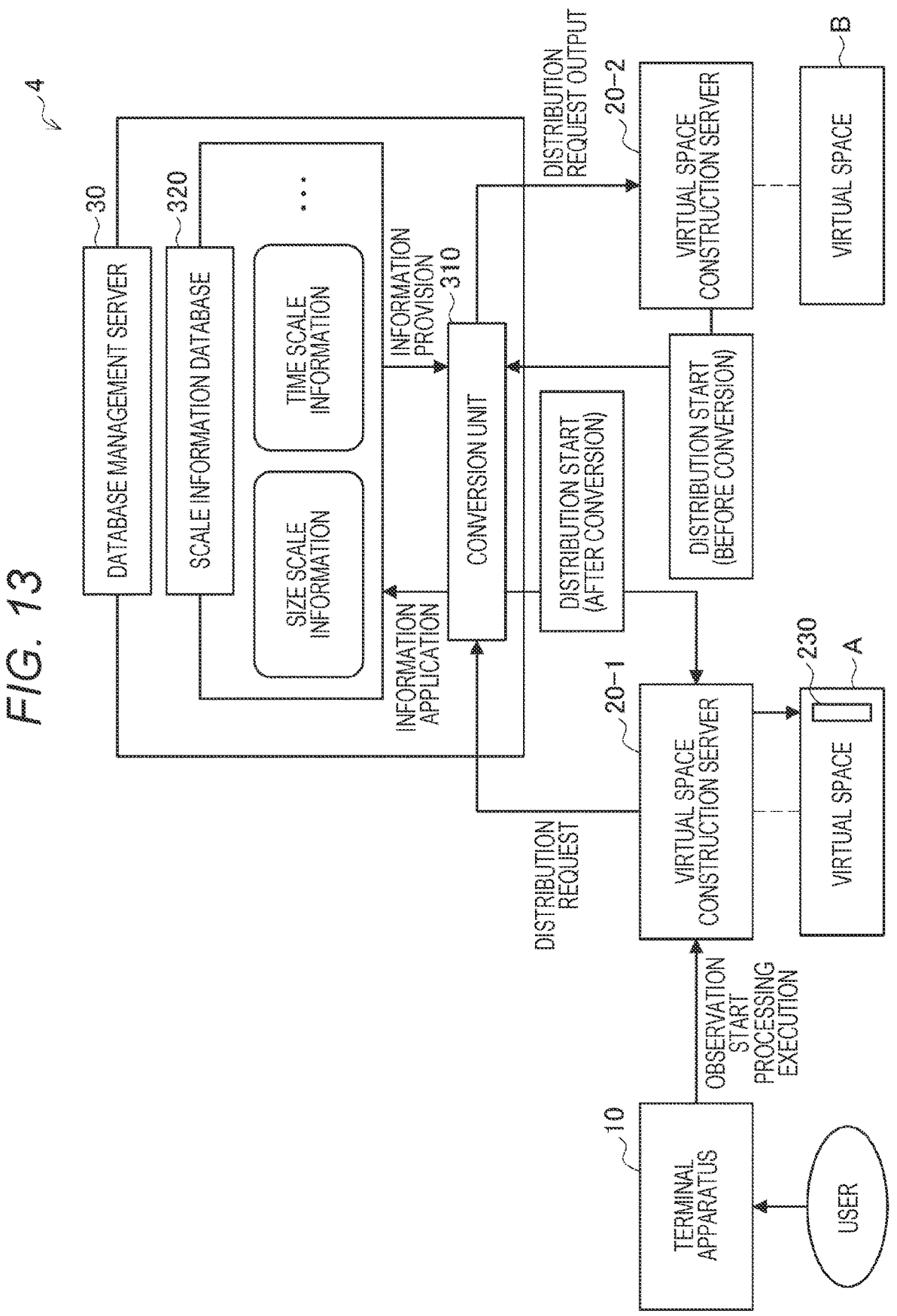
FIG. 13 is a diagram for explaining Modification 2 of the embodiment of the present disclosure.

FIG. 13 is a diagram for explaining Modification 2 of the embodiment of the present disclosure. Referring to FIG. 13, an information processing system 4 according to Modification 2 of the embodiment of the present disclosure is illustrated. The information processing system 4 includes a terminal apparatus 10, virtual space construction servers 20-1 to 20-2, and a database management server 30. Here, a virtual display device 230 exists in the virtual space A. Hereinafter, the flow of the operation of the information processing system 4 according to Modification 2 will be described.

In the terminal apparatus 10, an instruction to move the video of the virtual space B from the virtual space B to the virtual space A is input by the user. More specifically, a case where the video of the virtual space B is selected by the user as the movement target is assumed. In such a case, the virtual space construction server 20-1 recognizes the value used to display the video of the virtual space B as the conversion target, recognizes the selected virtual space B as the virtual space of the movement source, and recognizes the virtual space A to which the user is logging in as the virtual space of the movement destination.

Note that the instruction to move the video of the virtual space B from the virtual space B to the virtual space A may be input by a person other than the user. Alternatively, occurrence of a predetermined event in the virtual space A may be treated as a movement instruction of the video of the virtual space B. The virtual space construction server 20-1 notifies the database management server 30 of the conversion target, the video of the selected virtual space B, the virtual space of the movement source, and the virtual space of the movement destination.

In the database management server 30, the conversion unit 310 acquires the scale information in the virtual space A as the movement destination and the scale information in the virtual space B as the movement source from the scale information database 320 on the basis of the instruction to move the video of the virtual space B from the virtual space B to the virtual space A, and calculates the conversion parameter C on the basis of the acquired scale information in the virtual space A as the movement destination and scale information in the virtual space B as the movement source. Then, the conversion unit 310 converts the conversion target on the basis of the calculated conversion parameter C to obtain a conversion result (converted value).

The conversion unit 310 notifies the virtual space construction server 20-1 of the conversion result and notifies the virtual space construction server 20-2 of the video distribution request. The virtual space construction server 20-2 transmits the video of the virtual space B to the conversion unit 310 on the basis of the distribution request, and the conversion unit 310 transmits the video of the virtual space B to the virtual space construction server 20-1. The virtual space construction server 20-1 controls the display of the video of the virtual space B in the virtual space A on the basis of the conversion result notification of which is provided from the conversion unit 310.

For example, in a case where the conversion result notification of which is provided from the conversion unit 310 is the spatial size of the video of the virtual space B, the virtual space construction server 20-1 may match the spatial size of the video of the virtual space B in the virtual space A as the movement destination with the spatial size of the video of the virtual space B notification of which is provided from the conversion unit 310. Alternatively, in a case where the conversion result notification of which is provided from the conversion unit 310 is the FPS of the video of the virtual space B, the virtual space construction server 20-1 may match the FPS of the video of the virtual space B in the virtual space A as the movement destination with the FPS of the video of the virtual space B notification of which is provided from the conversion unit 310.

The virtual space construction server 20-1 calculates the coordinates of the video of the virtual space B in the virtual space A, and moves the video of the virtual space B to the calculated coordinates. For example, the virtual space construction server 20-1 may arrange the video of the virtual space B controlled on the basis of the conversion result at the display position by the virtual display device 230 existing in the virtual space A. As a result, it is possible to perform presentation for causing the avatar to observe the video of the virtual space B displayed on the virtual display device 230 existing in the virtual space A.

The virtual space A in which the video of the virtual space B is arranged in this manner is provided from the virtual space construction server 20-1 to the terminal apparatus 10 and presented to the user by the terminal apparatus 10. At this time, since the value used to display the video of the virtual space B in the virtual space A is automatically converted by the conversion unit 310, the discomfort given to the user in moving the video of the virtual space B from the virtual space B to the virtual space A can be reduced.

As an example, a case is assumed where the virtual space A operates at 30 FPS and the virtual space B operates at 60 FPS. At this time, a mismatch in video reproduction speed occurs between the virtual space A and the virtual space B. More specifically, in a case where the video of the virtual space B is arranged in the virtual space A, the reproduction time of the video of the virtual space B is originally one second, but is required for two seconds in the virtual space A. Meanwhile, in a case where the video of the virtual space A is arranged in the virtual space B, it is necessary to insert a video that interpolates the insufficient 30 FPS into the video of the virtual space A.

However, according to Modification 2, as described above, the FPS of the video of the virtual space of the movement source can be automatically converted into the FPS in the virtual space of the movement destination. That is, according to Modification 2, the video reproduction speed is automatically accelerated or decelerated.

Modification 2 of the embodiment of the present disclosure has been described above.

2.3. Modification 3

Next, Modification 3 of the embodiment of the present disclosure will be described.

The case where the scale information in the virtual space as the movement destination and the scale information in the virtual space as the movement source are used for calculating the conversion parameter C has been mainly described above. However, as described above, a case is also assumed where the scale information in the virtual space of the movement source is not used for calculating the conversion parameter C. For example, a case is also assumed where the movement source of the target object is not the virtual space but the creator of the content. Such a case will be described with reference to FIG. 14.

Figure 14:
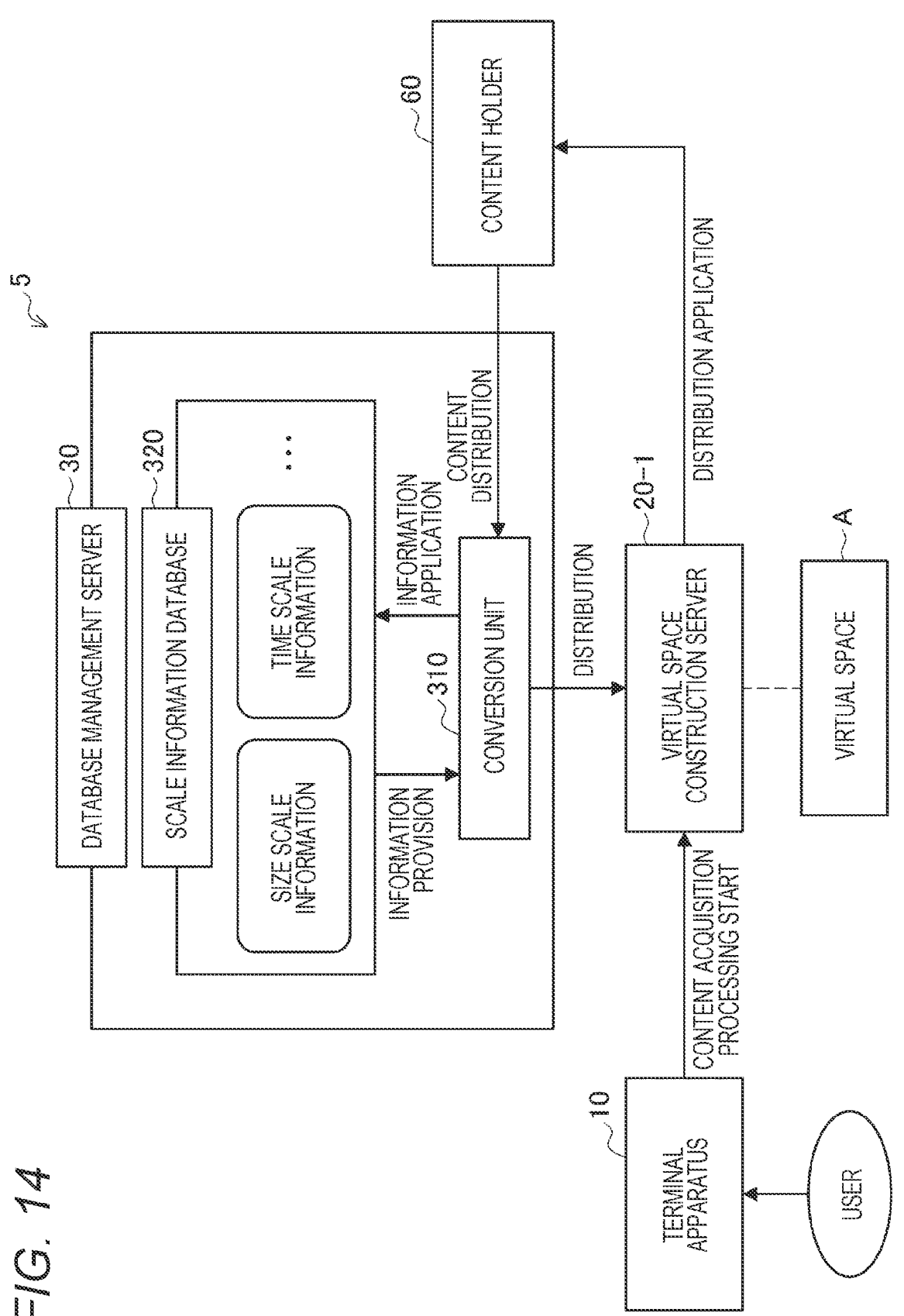
FIG. 14 is a diagram for explaining Modification 3 of the embodiment of the present disclosure.

FIG. 14 is a diagram for explaining Modification 3 of the embodiment of the present disclosure. Referring to FIG. 14, an information processing system 5 according to Modification 3 of the embodiment of the present disclosure is illustrated. The information processing system 5 includes a terminal apparatus 10, a virtual space construction server 20-1, a database management server 30, and a content holder 60.

In the content holder 60, content (for example, three-dimensional content or the like) created by a creator is registered in advance. The type of content is not limited. For example, the content may be content with motion attached to the target object by the creator or content obtained by volumetric capture techniques.

In the content, in addition to the target object being recorded, the motion of the target object is recorded in association with the target object as an example of a value used to display the target object. Here, the motion of the target object may be expressed in any way. For example, the motion of the target object can be expressed by a combination of a positional change of the target object and a time (frame) required for the positional change.

Note that the content holder 60 is a server in which content is registered. For example, the content holder 60 may be a content sales site, an asset store, a virtual space construction server other than the virtual space construction server 20-1, or other content holders.

In this way, the content registered in the content holder 60 can be shared by a plurality of users. In Modification 3, it is realized that the content is reproduced as intended by the creator (that is, motion is attached to the target object as intended by the creator) in the virtual space in which the content is reproduced. Hereinafter, the flow of the operation of the information processing system 4 according to Modification 3 will be described.

In the terminal apparatus 10, a case is assumed where content is selected as a movement target by the user. In such a case, the virtual space construction server 20-1 transmits a distribution application of the selected content to the content holder 60. The content holder 60 distributes the distribution applied content to the database management server 30 and notifies the database management server 30 of the virtual space A as the movement destination of the content.

In the database management server 30, the conversion unit 310 acquires the FPS (time scale information) in the virtual space A as the movement destination from the scale information database 320, and converts the motion of the target object included in the content into the motion of the target object in the virtual space A on the basis of the acquired FPS in the virtual space A as the movement destination and the motion of the target object included in the content.

Here, a method of converting the motion of the target object by the conversion unit 310 is not limited. For example, the method of converting the motion of the target object by the conversion unit 310 may be determined according to the expression format of the motion of the target object.

As an example of the expression format of the motion of the target object, a format in which the positional change of the target object is recorded at equal intervals can be assumed. For example, in a case where the FPS of the target object included in the content is 60 FPS and in a case where the target object moves from the coordinates 0 to the coordinates 60 in 1 second, information of "one movement per frame" is recorded as the motion of the target object included in the content.

Furthermore, as another example of the expression format of the motion of the target object, a format is assumed in which the positions of the target objects at the start point (first frame) and the end point (second frame) are recorded and the positions therebetween are interpolated. For example, in a case where the FPS of the target object included in the content is 60 FPS, information such as "start moving at frame 0, stop at coordinates 20 at frame 10, start moving again at frame 25, and stop at coordinates 60 at frame 60" is recorded.

For example, in a case where a format of recording the positional change of the target object at equal intervals is adopted, the conversion unit 310 may convert the motion of the target object included in the content into the motion of the target object in the virtual space A by adding or deleting one or a plurality of frames to or from the frame related to the motion of the target object on the basis of the FPS associated with the target object and the FPS in the virtual space A.

More specifically, the conversion unit 310 calculates a ratio (conversion parameter C) of the FPS in the virtual space A to the FPS associated with the target object. Then, the conversion unit 310 is only required to add or delete one or a plurality of frames to or from the frame related to the motion of the target object so that the number of frames related to the motion of the target object increases or decreases to the calculated ratio.

On the other hand, in a case where the format of recording the positions of the target objects of the start point and the end point and interpolating the positions therebetween is adopted, the conversion unit 310 is only required to convert the motion of the target object included in the content into the motion of the target object in the virtual space A by correcting the frame number (for example, frames 0, 10, 25, and 60) of the start point or the end point on the basis of the FPS associated with the target object and the FPS in the virtual space A.

More specifically, the conversion unit 310 calculates a ratio (conversion parameter C) of the FPS in the virtual space A to the FPS associated with the target object. Then, the conversion unit 310 is only required to convert the motion of the target object included in the content into the motion of the target object in the virtual space A by performing correction of multiplying the frame number of the start point or the end point by the calculated ratio.

The conversion unit 310 distributes the content to the virtual space construction server 20-1 and notifies the virtual space construction server 20-1 of the motion of the target object in the virtual space A. The virtual space construction server 20-1 controls the display of the target object in the virtual space A on the basis of the motion of the target object in the virtual space A notification of which is provided from the conversion unit 310. For example, the virtual space construction server 20-1 may match the motion of the target object in the virtual space A with the motion of the target object in the virtual space A notification of which is provided from the conversion unit 310.

The virtual space construction server 20-1 calculates the coordinates of the target object in the virtual space A and moves the target object to the calculated coordinates.

The content selected by the user in this manner is provided from the content holder 60 to the terminal apparatus 10 from the virtual space construction server 20-1 via the database management server 30, and is presented to the user by the terminal apparatus 10. At this time, since the motion of the target object in the virtual space A is automatically adjusted by the conversion unit 310, the discomfort given to the user when the target object moves to the virtual space A can be reduced.

Modification 3 of the embodiment of the present disclosure has been described above.

2.4. Modification 4

Next, Modification 4 of the embodiment of the present disclosure will be described.

In the above description, the spatial size of the target object, the FPS of the target object, and the like have been mainly described as examples of the value used for displaying the target object. However, the value used to display the target object is not limited to such an example. More specifically, an object of an embodiment of the present disclosure is to absorb a difference in environment generated between a plurality of virtual spaces. Therefore, any unit system can be commonly applied as the value used to display the target object.

For example, the value used to display the target object may be a value indicating a feature of the target object arranged in the virtual space A. At this time, the conversion result may be a value indicating the feature of the target object arranged in the virtual space B. Note that, examples of the features of the target object include the weight (mass) of the target object, the energy amount possessed by the target object, softness of the target object, and heat resistance of the target object. In addition, the spatial size of the target object, the FPS of the target object, and the like described above can correspond to examples of values indicating the features of the target object.

Alternatively, the value used to display the target object may be a value related to an environment that affects the target object in the virtual space A. At this time, the conversion result may be a value related to an environment that affects the target object of the virtual space B. Note that examples of the value regarding the environment that affects the target object include gravity (gravitational acceleration), pressure (atmospheric pressure or water pressure), light amount, and the like.

Hereinafter, what kind of problem will occur in a case where the conversion according to the embodiment of the present disclosure is not performed on the value indicating the feature of the target object or the value related to the environment that affects the target object will be specifically described.

(Weight)

In calculating the interference between the target and the object or the interaction between the target and the user, in a case where the weight of the target object is not appropriately set, it is expected that the target object does not move or the target object does not appropriately touch the ground in a certain virtual space.

(Gravity)

Gravity may be used to depict a planet, to interfere with virtual space and an object or user, and the like. If the gravity is not shared among the plurality of virtual spaces, for example, the target object may start to rise immediately after the target object moves between the virtual spaces and may continue to rise indefinitely. Alternatively, it is expected that a problem such as the target object flying in an unintended direction occurs after the target object is thrown.

(Pressure)

Pressure is generally expected to be used as atmospheric pressure or water pressure, such as in mountain, sea, flight or representation of space. In a case where the pressure is not correctly converted between a plurality of virtual spaces, there may be a problem that the moving speed of the user who has moved from a certain virtual space does not decrease even in the water, or the action of the user who has moved from another virtual space is extremely limited.

(Energy Amount)

The energy amount (joules) is expected to be used to express heat or the like retained by the target object. When the conversion of the energy amount fails, it is easily imagined that the expression of the solid, liquid, and gas is not correctly performed. In this case, for example, expressions often used in existing game works such as accurate weather simulation, expression of fog, expression of ice, and the like may fail.

(Light Amount)

The light amount is likely to be frequently used to define the brightness of the entire space. Even if the numerical value item is not defined as the light amount, it is conceivable that the light amount is substantially expressed by a format such as the intensity of light, the intensity of sunlight defined by the time zone, or the like. In a case where the light amount is not appropriately set, it is expected that a problem such as the space being too dark or the space being too bright occurs.

(Softness)

It is considered that softness (hardness) is utilized to express graspability, texture, and the like of a target object in a virtual space. In a case where there is a problem in the softness conversion, for example, it is considered that problems such as the hardness of a "food" object being set to iron-like hardness and the user being damaged when the "food" object comes into contact with the user, a "structure" object being too flexible and the "structure" object being unable to stand on its own, and the like occur.

(Heat Resistance)

Heat resistance is a parameter necessary for defining a target object in a virtual space. For example, in a virtual space in which cooking can be performed, it is assumed that cooking using a pot or a frying pan is performed. In such a case, in a case where heat resistance conversion is not correctly performed and a container or the like extremely weak to heat is generated, there may be a problem that expected cooking is not correctly performed.

Modification 4 of the embodiment of the present disclosure has been described above.

2.5. Modification 5

Next, Modification 5 of the embodiment of the present disclosure will be described.

In the above description, a case where the data recorded in the scale information database 320 is normal has been mainly assumed. However, the data recorded in the scale information database 320 is not necessarily normal. In a case where the data recorded in the scale information database 320 is not normal, it is necessary to take appropriate measures. Hereinafter, two types of examples will be described as examples in which the data recorded in the scale information database 320 is not normal.

(Case where Absolute Scale is not Present)

Depending on the setting of the virtual space by the administrator, scale information corresponding to the virtual space may not be recorded in the scale information database 320. More specifically, there may be a case where scale information corresponding to at least one of the virtual space A as the movement source or the virtual space B as the movement destination is not recorded in the scale information database 320.

In such a case, the conversion unit 310 is only required to determine whether the same target object arranged in the virtual space B as the movement destination of the target object and the virtual space A as the movement source of the target object exists. Here, whether or not the same target object arranged in the virtual space B and the virtual space A exists may be determined in any manner.

As an example, in a case where coordinates at which the target object exists in the virtual space B and coordinates at which the target object exists in the virtual space A are the same, the conversion unit 310 may regard these target objects as the same target object. As another example, in a case where the data name attached to the target object in the virtual space B is the same as the data name attached to the target object in the virtual space A, the conversion unit 310 may regard these target objects as the same target object. As another example, the conversion unit 310 may regard the target object selected by the user in the virtual space A and the target object selected by the user in the virtual space B as the same target object.

Then, in a case where the same target object arranged in the virtual space B and the virtual space A exists, the conversion unit 310 is only required to calculate the conversion parameter C on the basis of a value used for displaying the same target object. Then, similarly to the above, the conversion unit 310 is only required to convert the value used to display the target object by using the calculated conversion parameter C.

As an example, a case where the spatial size of the target object is used as the value used to display the target object will be described. Here, a case is assumed where scale information corresponding to at least one of the virtual space A or the virtual space B is not recorded in the scale information database 320. Then, it is assumed that the conversion unit 310 detects the Tokyo tower as an example of the same target object arranged in the virtual space B and the virtual space A.

It is assumed that "333" is registered in the scale information database 320 as the spatial size of the Tokyo tower in the virtual space A, and "0.333" is registered in the scale information database 320 as the spatial size of the Tokyo tower in the virtual space B. At this time, the conversion unit 310 only needs to calculate "1/1000", which is a ratio of the spatial size "333" of the Tokyo tower in the virtual space B as the movement destination to the spatial size "0.333" of the Tokyo tower in the virtual space A as the movement source, as the conversion parameter C.

(Case where Unbalanced Value is Mixed)

The scale information recorded in the scale information database 320 may be rewritten by a malicious third party. However, even in such a case, the embodiment of the present disclosure can cope with such a case.

For example, in a case where the ratio between the scale information in the virtual space B and the scale information in the virtual space A exceeds a predetermined range, the conversion unit 310 preferably replaces one piece of the scale information (hereinafter, also referred to as a "singular value") with another piece of the scale information. This makes it possible to prevent an unbalanced value from adversely affecting the movement of the target object between the plurality of virtual spaces. For example, the singular value may be replaced with scale information in another virtual space, or may be replaced with a representative value (for example, a median value or the like) of the scale information in another virtual space.

Note that the conversion unit 310 may recognize either the scale information in the virtual space B or the scale information in the virtual space A as a singular value. For example, among the scale information in the virtual space B and the scale information in the virtual space A, the conversion unit 310 may recognize, as a singular value, scale information having a larger difference from the scale information in another virtual space.

For example, a case is assumed where the unit of the length is meter in another virtual space, whereas the unit of the length is terameter in any one of the scale information in the virtual space B and the scale information in the virtual space A. In such a case, the conversion unit 310 may recognize the scale information in the one virtual space as a singular value.

Note that the above-described adverse effect may include an attack by a third party that causes the user moving from the virtual space in which the scale information is falsified to be displayed in a huge size in the scale information database 320. Alternatively, the adverse effect described above may include an attack by a third party such that an object moving from the virtual space in which the scale information is falsified destroys an object in the virtual space as a movement destination.

Currently, as the attack via the Internet, an attack using a virus or a huge file, an attack by fraud, and the like are mainly known. Meanwhile, when the virtual space becomes widespread, it is considered that an attack that affects the three-dimensional space occurs. Therefore, it is important to secure robustness against falsification using the technology according to the embodiment of the present disclosure (including the distributed management method and the like).

Various possible modifications have been described above.

3. Hardware Configuration Example

Figure 15:
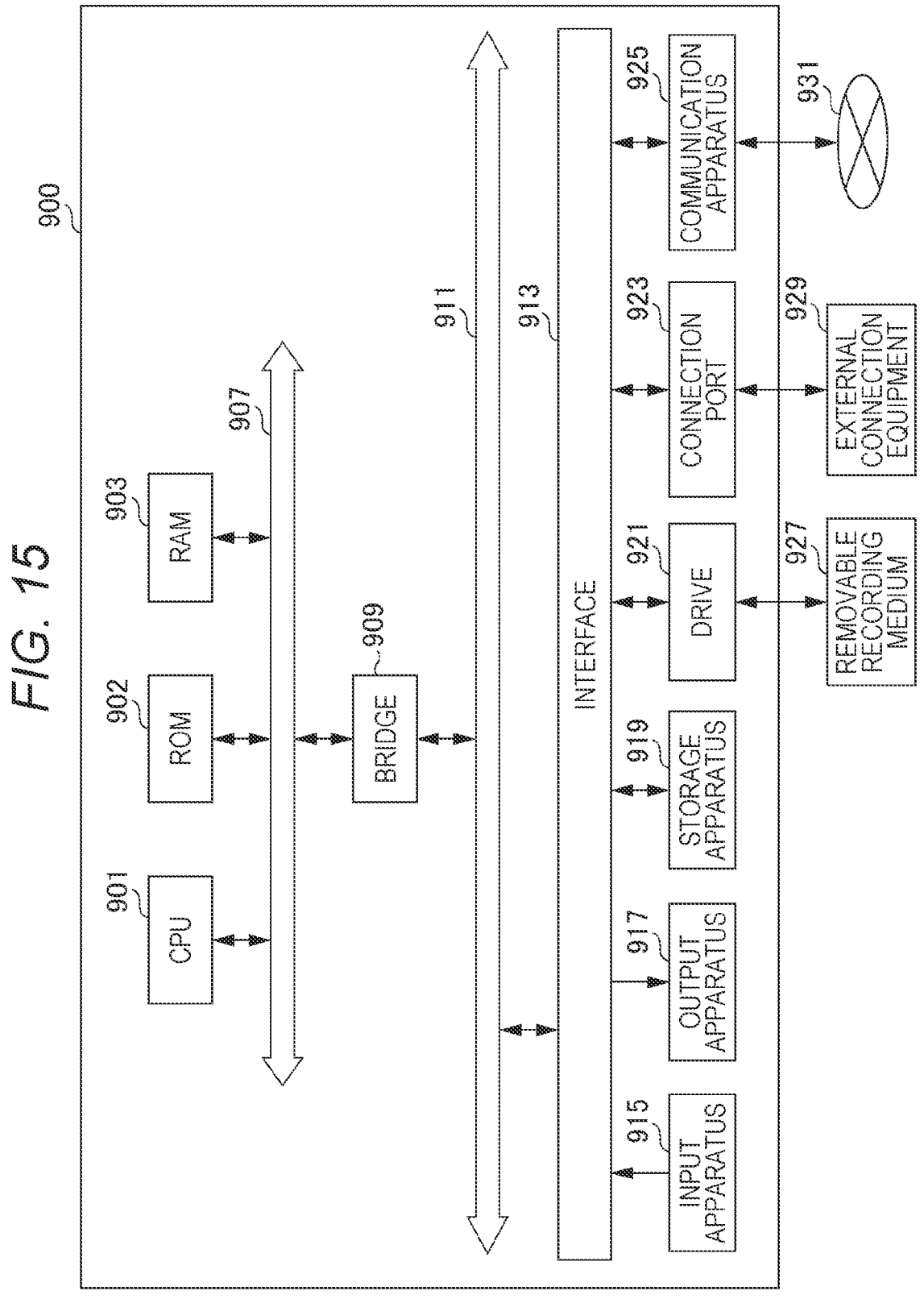
FIG. 15 is a block diagram illustrating a hardware configuration example of an information processing apparatus as an example of a database management server according to an embodiment of the present disclosure.

Next, a hardware configuration example of an information processing apparatus 900 as an example of the database management server 30 according to the embodiment of the present disclosure will be described with reference to FIG. 15. FIG. 15 is a block diagram illustrating the hardware configuration example of the information processing apparatus 900. Note that the database management server 30 does not necessarily have the entire hardware configuration illustrated in FIG. 15, and a part of the hardware configuration illustrated in FIG. 15 may not exist in the database management server 30. Note that the hardware configurations of the virtual space construction server 20 and the terminal apparatus 10 can be similarly realized.

As illustrated in FIG. 15, the information processing apparatus 900 includes a central processing unit (CPU) 901, a read only memory (ROM) 903, and a random access memory (RAM) 905. Also, the information processing apparatus 900 may include a host bus 907, a bridge 909, an external bus 911, an interface 913, an input apparatus 915, an output apparatus 917, a storage apparatus 919, a drive 921, a connection port 923, and a communication apparatus 925. The information processing apparatus 900 may have a processing circuit called a digital signal processor (DSP) or an application specific integrated circuit (ASIC) instead of or in combination with the CPU 901.

The CPU 901 functions as an arithmetic processing apparatus and a control apparatus and controls overall working in the information processing apparatus 900 or a part thereof, in accordance with various programs recorded in the ROM 903, the RAM 905, the storage apparatus 919, or a removable recording medium 927. The ROM 903 stores programs, calculation parameters, and the like used by the CPU 901. The RAM 905 temporarily stores a program used in execution by the CPU 901, parameters that change as appropriate during the execution, and the like. The CPU 901, the ROM 903, and the RAM 905 are mutually connected by the host bus 907 including an internal bus such as a CPU bus. Furthermore, the host bus 907 is connected to the external bus 911 such as a peripheral component interconnect/interface (PCI) bus via the bridge 909.

The input apparatus 915 is, for example, an apparatus, such as a button, operated by the user. The input apparatus 915 may include a mouse, a keyboard, a touch panel, a switch and a lever, or the like. Furthermore, the input apparatus 915 may also include a microphone that detects voice of the user. The input apparatus 915 may be, for example, a remote control apparatus using infrared rays or other radio waves, or external connection equipment 929 such as a mobile phone adapted to the operation of the information processing apparatus 900. The input apparatus 915 includes an input control circuit that generates and outputs an input signal to the CPU 901 on the basis of information input by the user. By operating the input apparatus 915, the user inputs various kinds of data or gives an instruction to perform a processing operation, to the information processing apparatus 900. Furthermore, an imaging apparatus 933 as described later can function as the input apparatus by capturing an image of motion of a hand of the user, a finger of the user, or the like. At this time, a pointing position may be determined in accordance with the motion of the hand and the direction of the finger.

The output apparatus 917 includes an apparatus that can visually or audibly notify the user of acquired information. The output apparatus 917 may be, for example, a display apparatus such as a liquid crystal display (LCD) or an organic electro-luminescence (EL) display, an audio output apparatus such as a speaker or a headphone, or the like. Furthermore, the output apparatus 917 may include a plasma display panel (PDP), a projector, a hologram, a printer apparatus, or the like. The output apparatus 917 outputs a result of processing performed by the information processing apparatus 900 as a video such a text or an image, or outputs the result as a sound such as voice or audio. Furthermore, the output apparatus 917 may include a light or the like in order to brighten the surroundings.

The storage apparatus 919 is a data storage apparatus configured as an example of a storage unit of the information processing apparatus 900. The storage apparatus 919 includes, for example, a magnetic storage device such as a hard disk drive (HDD), a semiconductor storage device, an optical storage device, a magneto-optical storage device, or the like. The storage apparatus 919 stores programs executed by the CPU 901 and various kinds of data, various kinds of data acquired from the outside, and the like.

The drive 921 is a reader/writer for the removable recording medium 927, such as a magnetic disk, an optical disc, a magneto-optical disk, or a semiconductor memory, and is built in or externally attached to the information processing apparatus 900. The drive 921 reads information recorded in the mounted removable recording medium 927 and outputs the read information to the RAM 905. Furthermore, the drive 921 writes records in the mounted removable recording medium 927.

The connection port 923 is a port for directly connecting equipment to the information processing apparatus 900. The connection port 923 may be, for example, a universal serial bus (USB) port, an IEEE1394 port, a small computer system interface (SCSI) port, or the like. Furthermore, the connection port 923 may be an RS-232C port, an optical audio terminal, a high-definition multimedia interface (HDMI (registered trademark)) port, or the like. By connecting the external connection equipment 929 to the connection port 923, various data can be exchanged between the information processing apparatus 900 and the external connection equipment 929.

The communication apparatus 925 is, for example, a communication interface including a communication device or the like for connecting to the network 931. The communication apparatus 925 may be, for example, a communication card for a wired or wireless local area network (LAN), Bluetooth (registered trademark), wireless USB (WUSB), or the like. Furthermore, the communication apparatus 925 may be a router for optical communication, a router for asymmetric digital subscriber line (ADSL), a modem for various types of communication, or the like. For example, the communication apparatus 925 transmits and receives signals and the like to and from the Internet and other communication equipment, by using a predetermined protocol such as TCP/IP. Furthermore, the network 931 connected to the communication apparatus 925 is a network connected in a wired or wireless manner, and is, for example, the Internet, a home LAN, infrared communication, radio wave communication, satellite communication, or the like.

4. Conclusion

According to an embodiment of the present disclosure, there is provided an information processing apparatus including a conversion unit that performs conversion of a value used for display of a target object to obtain a converted value on the basis of a value used for display of the target object arranged in a virtual space and a conversion value determined on the basis of at least scale information in a first virtual space. According to such a configuration, it is possible to reduce the discomfort given to the user who logs in the virtual space.

The preferred embodiment of the present disclosure has been described above in detail with reference to the accompanying drawings, but the technical scope of the present disclosure is not limited to such examples. It is obvious that those with ordinary skill in the technical field of the present disclosure may conceive various alterations or corrections within the scope of the technical idea recited in the claims, and it is naturally understood that these alterations or modifications also fall within the technical scope of the present disclosure.

Furthermore, the effects described in the present specification are merely exemplary or illustrative, and not restrictive. That is, the technology according to the present disclosure may provide other effects described above that are apparent to those skilled in the art from the description of the present specification, in addition to or instead of the effects described above.

Note that the following configurations also fall within the technical scope of the present disclosure.

(1)
An information processing apparatus including
a conversion unit that performs conversion of a value used for display of a target object arranged in a virtual space on the basis of the value used for display of the target object and a conversion value determined on the basis of at least scale information in a first virtual space to obtain a converted value.

(2)
The information processing apparatus according to (1),
in which the conversion unit performs the conversion on the basis of the value used for display of the target object and a conversion value determined on the basis of the scale information in the first virtual space and scale information in a second virtual space different from the first virtual space.

(3)
The information processing apparatus according to (2),
in which the value used for display of the target object is used for display of the target object arranged in the second virtual space, and
the converted value is used for display of the target object arranged in the first virtual space.

(4)
The information processing apparatus according to (2) or (3),
in which the conversion unit acquires the value used for display of the target object from a second construction apparatus that constructs the second virtual space, and notifies a first construction apparatus that constructs the first virtual space of the converted value, and
the target object is controlled by the first construction apparatus according to the converted value in the first virtual space.

(5)
The information processing apparatus according to (4),
in which the scale information in the first virtual space and the scale information in the second virtual space are stored by a server different from both the first construction apparatus and the second construction apparatus.

(6)
The information processing apparatus according to (4),
in which the scale information in the first virtual space and the scale information in the second virtual space are stored by one of the first construction apparatus and the second construction apparatus, and
same information as the scale information in the first virtual space and the scale information in the second virtual space is stored by an other of the first construction apparatus and the second construction apparatus.

(7)
The information processing apparatus according to (6),
in which an expiration date is associated with the scale information in the second virtual space stored by the first construction apparatus, and in a case where the expiration date has elapsed, the scale information in the second virtual space stored by the first construction apparatus is updated with new scale information in the second virtual space stored by the second construction apparatus.

(8)
The information processing apparatus according to any one of (2) to (7),
in which the conversion unit performs the conversion on the basis of a movement instruction of the target object from the second virtual space to the first virtual space.

(9)
The information processing apparatus according to (8),
in which the target object is an avatar corresponding to a user or a product created in the second virtual space by the user.

(10)
The information processing apparatus according to any one of (2) to (9),
in which the value used for display of the target object is a value indicating a feature of the target object arranged in the second virtual space, and
the converted value is a value indicating a feature of the target object arranged in the first virtual space.

(11)
The information processing apparatus according to any one of (2) to (9),
in which the value used for display of the target object is a value related to an environment that affects the target object in the second virtual space, and the converted value is a value related to an environment that affects the target object in the first virtual space.

(12)
The information processing apparatus according to any one of (2) to (9),
in which the target object is a video of the second virtual space.

(13)
The information processing apparatus according to (12),
in which the target object is controlled on the basis of the converted value and then arranged at a display position by a virtual display device existing in the first virtual space.

(14)
The information processing apparatus according to (1),
in which the value used for display of the target object is a motion of the target object registered in advance, and
the converted value is a motion of the target object in the first virtual space.

(15)
The information processing apparatus according to (14),
in which the conversion unit performs the conversion by adding or deleting one or a plurality of frames to or from a frame related to the motion of the target object on the basis of scale information associated with the target object and the scale information in the first virtual space.

(16)
The information processing apparatus according to (14),
in which the motion of the target object includes a position of the target object in a first frame and a position of the target object in a second frame after the first frame, and
the conversion unit performs the conversion by correcting a number of the first frame or a number of the second frame on the basis of scale information associated with the target object and the scale information in the first virtual space.

(17)
The information processing apparatus according to any one of (2) to (13),
in which the conversion unit calculates the conversion value on the basis of a value used for display of a same target object arranged in the first virtual space and the second virtual space.

(18)
The information processing apparatus according to any one of (2) to (13),
in which, in a case where a ratio between the scale information in the first virtual space and the scale information in the second virtual space exceeds a predetermined range, the conversion unit replaces one piece of the scale information with another piece of the scale information.

(19)
An information processing method including
performing conversion of a value used for display of a target object arranged in a virtual space on the basis of the value used for display of the target object and a conversion value determined on the basis of at least scale information in a first virtual space to obtain a converted value.

(20)
A program for causing a computer to function as an information processing apparatus including
a conversion unit that performs conversion of a value used for display of a target object arranged in a virtual space on the basis of the value used for display of the target object and a conversion value determined on the basis of at least scale information in a first virtual space to obtain a converted value.

REFERENCE SIGNS LIST

1 to 5 Information processing system
10 Terminal apparatus
110 Operation unit
130 Control unit
140 Storage unit
160 Communication unit
180 Presentation unit
20 Virtual space construction server
230 Display device
30 Database management server
310 Conversion unit
320 Scale information database
40 Cache server
410 Conversion unit
50 Cache server
60 Content holder

The invention claimed is:

1. An information processing apparatus comprising:
circuitry configured to perform conversion of a value used for display of a target object arranged in a virtual space based on the value used for display of the target object and a conversion value,
wherein the conversion value is determined based on scale information in a first virtual space and scale information in a second virtual space different from the first virtual space to obtain a converted value, and
wherein the conversion value is further determined according to a predetermined range of a ratio between the scale information in the first virtual space and the scale information in the second virtual space.

2. The information processing apparatus according to claim 1,
wherein the value used for display of the target object is used for display of the target object arranged in the second virtual space, and
wherein the converted value is used for display of the target object arranged in the first virtual space.

3. The information processing apparatus according to claim 1,
wherein the circuitry is further configured to
acquire the value used for display of the target object from a second construction apparatus that constructs the second virtual space, and
notify a first construction apparatus that constructs the first virtual space of the converted value, and
wherein the target object is controlled by the first construction apparatus according to the converted value in the first virtual space.

4. The information processing apparatus according to claim 3,
wherein the scale information in the first virtual space and the scale information in the second virtual space are stored by a server different from both the first construction apparatus and the second construction apparatus.

5. The information processing apparatus according to claim 3,
wherein the scale information in the first virtual space and the scale information in the second virtual space are stored by one of the first construction apparatus and the second construction apparatus, and wherein same information as the scale information in the first virtual space and the scale information in the second virtual space is stored by another of the first construction apparatus and the second construction apparatus.

6. The information processing apparatus according to claim 5, wherein an expiration date is associated with the scale information in the second virtual space stored by the first construction apparatus, and in a case where the expiration date has elapsed, the scale information in the second virtual space stored by the first construction apparatus is updated with new scale information in the second virtual space stored by the second construction apparatus.

7. The information processing apparatus according to claim 1, wherein the circuitry performs the conversion based on a movement instruction of the target object from the second virtual space to the first virtual space.

8. The information processing apparatus according to claim 7, wherein the target object is an avatar corresponding to a user or a product created in the second virtual space by the user.

9. The information processing apparatus according to claim 1, wherein the value used for display of the target object is a value indicating a feature of the target object arranged in the second virtual space, and wherein the converted value is a value indicating a feature of the target object arranged in the first virtual space.

10. The information processing apparatus according to claim 1, wherein the value used for display of the target object is a value related to an environment that affects the target object in the second virtual space, and wherein the converted value is a value related to an environment that affects the target object in the first virtual space.

11. The information processing apparatus according to claim 1, wherein the target object is a video of the second virtual space.

12. The information processing apparatus according to claim 11, wherein the target object is controlled based on a basis of the converted value and then arranged at a display position by a virtual display device existing in the first virtual space.

13. The information processing apparatus according to claim 1, wherein the value used for display of the target object is a motion of the target object registered in advance, and wherein the converted value is a motion of the target object in the first virtual space.

14. The information processing apparatus according to claim 13, wherein the circuitry performs the conversion by adding or deleting one or more frames to or from a frame related to the motion of the target object based on scale information associated with the target object and the scale information in the first virtual space.

15. The information processing apparatus according to claim 13, wherein the motion of the target object includes a position of the target object in a first frame and a position of the target object in a second frame after the first frame, and wherein the circuitry performs the conversion by correcting a number of the first frame or a number of the second frame based on scale information associated with the target object and the scale information in the first virtual space.

16. The information processing apparatus according to claim 1, wherein the circuitry is further configured to calculate the conversion value based on a value used for display of a same target object arranged in the first virtual space and the second virtual space.

17. The information processing apparatus according to claim 1, wherein, in a case where the ratio between the scale information in the first virtual space and the scale information in the second virtual space exceeds the predetermined range, the circuitry replaces one piece of scale information with another piece of scale information.

18. An information processing method comprising performing conversion of a value used for display of a target object arranged in a virtual space based on the value used for display of the target object and a conversion value, wherein the conversion value is determined based on scale information in a first virtual space and scale information in a second virtual space different from the first virtual space to obtain a converted value, and wherein the conversion value is further determined according to a predetermined range of a ratio between the scale information in the first virtual space and the scale information in the second virtual space.

19. A non-transitory computer-readable storage medium having embodied thereon a program, which when executed by a computer causes the computer to execute a method, the method comprising:

performing conversion of a value used for display of a target object arranged in a virtual space based on the value used for display of the target object and a conversion value, wherein the conversion value is determined based on scale information in a first virtual space and scale information in a second virtual space different from the first virtual space to obtain a converted value, and wherein the conversion value is further determined according to a predetermined range of a ratio between the scale information in the first virtual space and the scale information in the second virtual space.

* * * * *